United States Patent
Lee et al.

(10) Patent No.: US 8,163,199 B2
(45) Date of Patent: Apr. 24, 2012

(54) ALIGNMENT TREATMENT METHOD OF SUBSTRATE FOR LIQUID CRYSTAL DISPLAY DEVICE AND MANUFACTURING METHOD THEREOF

(75) Inventors: Han Lang Lee, Tainan County (TW); Shu Hao Hsu, Tainan County (TW); Cheng-Hsu Chuang, Tainan County (TW)

(73) Assignee: Chimei Innolux Corporation, Miao-Li County (TW)

( * ) Notice: Subject to any disclaimer, the term of this patent is extended or adjusted under 35 U.S.C. 154(b) by 185 days.

(21) Appl. No.: 12/493,411

(22) Filed: Jun. 29, 2009

(65) Prior Publication Data

US 2009/0325453 A1 Dec. 31, 2009

(30) Foreign Application Priority Data

Jun. 30, 2008 (TW) ................ 97124623 A
Oct. 21, 2008 (TW) ................ 97140353 A
Jun. 12, 2009 (TW) ................ 98119790 A

(51) Int. Cl.
*C09K 19/00* (2006.01)
*C09K 19/06* (2006.01)
*C09K 19/32* (2006.01)
*C09K 19/52* (2006.01)

(52) U.S. Cl. ............. 252/299.01; 252/299.4; 252/299.6; 428/1.1; 428/1.2; 428/1.3; 430/20; 445/58; 349/182; 349/191

(58) Field of Classification Search ............ 428/1.1, 428/1.2, 1.3; 252/299.01, 299.4, 299.6; 430/20; 445/58; 349/182, 191
See application file for complete search history.

*Primary Examiner* — Geraldina Visconti
(74) *Attorney, Agent, or Firm* — Lowe Hauptman Ham & Berner LLP

(57) ABSTRACT

A method for alignment treatment of a substrate for a liquid crystal display (LCD) device includes the steps of: forming an alignment film including a plurality of molecules with curable parts on a substrate; applying an electrical field on the substrate to rotate the curable parts; and curing the curable parts such that the curable parts are cured along a first direction. A manufacturing method of the LCD device is also disclosed.

20 Claims, 10 Drawing Sheets

ALIGNMENT TREATMENT METHOD OF SUBSTRATE FOR LIQUID CRYSTAL DISPLAY DEVICE AND MANUFACTURING METHOD THEREOF

CROSS REFERENCE TO RELATED APPLICATIONS

This Non-provisional application claims priority under 35 U.S.C. §119(a) to Patent Application No(s). 097124623 filed in Taiwan, Republic of China on Jun. 30, 2008, Patent Application No(s). 97140353 filed in Taiwan, Republic of China on Oct. 21, 2008, and Patent Application No(s). 098119790 filed in Taiwan, Republic of China on Jun. 12, 2009, the entire contents of which are hereby incorporated by reference.

BACKGROUND

The disclosure relates to a manufacturing method of a liquid crystal display (LCD) device and, in particular, to a method for alignment treatment of a substrate for the LCD device.

In the manufacturing process of a LCD device, two substrates are combined by a sealing material, and a liquid crystal (LC) material is injected into the space between the two substrates. Then, polarizing films are attached to the outer surfaces of the substrates, respectively, and a printed circuit board (PCB) with driving circuits is installed. Finally, a backlight unit is added so as to form the LCD device.

The substrate of the LCD device is disposed with an alignment film, so that the liquid crystal (LC) molecules disposed between the two substrates can be homogenously aligned. The steps for forming the alignment film include: coating a polyimide (PI) layer, pre-baking the PI layer, heating to remove the solvent in the PI layer, baking the PI layer to form the polymer material by acetylation, and aligning the PI layer. The conventional methods for aligning the PI layer include the rubbing method and the photo alignment method (hereinafter photo align method). The rubbing method is to rub the alignment film with rayon, and the photo align method is to use the linear polarized UV (LPUV) light to irradiate the alignment film. However, the rubbing method usually causes some residual particles, so a cleaning apparatus is subsequently needed to clean the alignment film. This increases the manufacturing steps and cost. In addition, the rubbing process may produce unexpected blemishes such as dents or scrapes, which decrease the product yield. Moreover, the static electricity induced by the rubbing process may damage circuits which are disposed on the substrates.

In the conventional photo align method, a UV light with a specific polarized direction (e.g. a direction having an included angle of 45° with y axis) is used to irradiate the alignment film, so that the alignment film can perform a photo chemical reaction with directional selectivity (the photo chemical reaction only occurs on those related to y axis). Thus, the molecules of the alignment film can be aligned in a specific direction, so the curing ratio of the molecules of the alignment film must be less than or equal to 50%. The area of the alignment film, which is irradiated by the UV light with the specific polarized direction, has decreased absorptivity of UV light (such as 45° and 135° as shown in FIG. 6). In FIG. 6, the vertical axis represents the absorptivity of the alignment film, and the horizontal axis represents the included angle between y axis and the polarization direction of the LPUV light irradiating the alignment film.

With the conventional photo align technology, if it is desired that the alignment film have a plurality of alignment directions, a mask is needed to expose the alignment film in different directions. This process is therefore very complex.

SUMMARY

The disclosure relates to a novel method for alignment treatment of a substrate for a liquid crystal display (LCD) device, which can resolve the above-mentioned problems encountered by the prior art.

A method for alignment treatment of a substrate for a LCD device according to at least one embodiment of the present invention includes the steps of: forming an alignment film having a plurality of molecules with curable parts on a substrate; applying an electrical field to the substrate to rotate the curable parts; and curing the curable parts such that the curable parts are cured along a first direction. The first direction is substantially in the plane which is parallel to the substrate.

Compared to the conventional rubbing treatment, this alignment treatment method does not generate static electricity or cause the above mentioned superficial blemishes, so that the product yield is not deteriorated. In addition, the alignment treatment method according to the embodiments of does not produce any residual particles, so that a subsequent cleaning step can be omitted, thereby reducing the manufacturing cost.

Compared with the conventional photo align technology, the disclosed embodiments utilizes an electrical field to perform the alignment treatment, and UV light to cure the alignment film material, so the curing ratio may be greater than 50% or approach 100%. In addition, the embodiments utilizes an electrical field to perform the alignment treatment, and the UV light is only used to cure the alignment film material. Accordingly, the UV light is not required to have the specific polarization direction, and the molecules of the alignment film can be polymerized without directional selectivity. After the alignment treatment of the alignment film by the electrical field, another UV light with different polarization characteristics, is applied to additionally irradiate the alignment film. The UV light absorbing frequencies of these two exposing processes, the absorption amounts in various polarized directions of the later UV light, which are absorbed by the alignment film, are roughly the same.

Also disclosed is a manufacturing method of a LCD device including the steps of: forming a first alignment film including a plurality of molecules with curable parts on a first substrate; applying an electrical field to the first alignment film to rotate the curable parts; curing the curable parts disposed on the first substrate such that the curable parts are cured along a first direction; forming an alignment film including a plurality of molecules with curable parts on a second substrate; applying an electrical field to the second alignment film to rotate the curable parts; curing the curable parts disposed on the second substrate such that the curable parts are cured along a second direction; combining the first and second substrates after the curing steps; and forming a liquid crystal layer between the first and second substrates. When using this method to manufacture a TN (twisted nematic) type LCD device, the first direction is approximately perpendicular to the second direction. When using this method to manufacture an IPS (in-plane switch) type LCD device, the first direction and the second direction are approximately the same.

Additionally disclosed is a manufacturing method of a LCD devie which includes the steps of: forming a first alignment film comprising a plurality of molecules with curable parts on a first substrate;combining the first substrate with a second substrate;applying an electrical field to the first alignment film to rotate the curable parts; curing the curable parts disposed on the first substrate such that the curable parts are cured along a first direction; and forming a liquid crystal layer between the first substrate and the second substrate.

Additionally disclosed is a manufacturing method of a LCD device which includes the steps of: forming a first alignment film including a plurality of molecules with curable parts on a first substrate; forming a liquid crystal layer between the first substrate and a second substrate; applying an electrical field to the liquid crystal layer and the first alignment film to rotate the liquid crystal molecules of the liquid crystal layer and the curable parts; and curing the curable parts such that the curable parts are cured along a first direction. This method is suitable for manufacturing the VA (vertically aligned) type LCD device. In accordance with one aspect of the embodiments, at least one of the first and second substrates has a pixel electrode with a plurality of slits, the width of the slit is 3.5 µm, and the width of the transparent electrode is also 3.5 µm. The slit and transparent electrode are both tilted at 45°, which is used to drive the liquid crystal molecules and the curable parts to rotate in manner that they exhibit a plurality of tilting directions. In addition, a mask can be used in the light curing process for achieving the multi-domain alignment.

The curable parts has either or both of a UV-light curable part and a thermal curable part.

During the process of applying energy to cure the curable parts, a reaction will occur between two adjacent curable parts, which have the same tilting direction, so that the two adjacent curable parts become cross-linked. This reaction can be a cycloaddition or a polymerization of functional groups.

The above-mentioned curing step can be implemented by either a light curing process or a thermal curing process.

The above-mentioned alignment layer further comprise 2-4% with the homeotropic alignment property are coated on a substrate.

Each of the surfaces of the first and second substrates can be disposed with a homeotropic alignment film, which includes a plurality of curable parts. The homeotropic alignment film can be formed on the substrate by spin coating or printing. The homeotropic alignment film includes a first polymer with a homeotropic alignment property, and the first polymer can be formed by polymerization of monomers with the curable part. The curable part can be extended from or located on the main chain of the first polymer. Otherwise, the curable parts can be extended from and located on the main chain of the first polymer, respectively. In addition, the first polymer may further include monomers with another curable part, and the another curable part may be extended from or located on the main chain of the first polymer.

Alternatively, the homeotropic alignment film may include a first polymer with the homeotropic alignment property and a second polymer. The second polymer can also be formed by polymerization of monomers with the curable part. The curable part can be extended from or located on the main chain of the second polymer. Otherwise, the curable parts can be extended from and located on the main chain of the second polymer, respectively. The curable parts of the first and second polymers can be the same or different, and the first and second polymers form the homeotropic alignment film by doping or co-polymerization.

The suitable curable parts of the embodiments may be as the following formula (I) or (II):

(I)

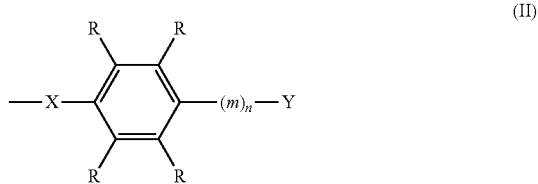

(II)

The monovalent link in the formula (I) or (II) is bonded to a main chain of the polymer.

In the formula (I), F represents

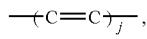

wherein j is 0 or a positive integer between 0 and 2.

In the formula (I), G represents

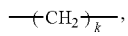

wherein k is 0 or a positive integer between 0 and 11.

In the formula (I) or (II), X represents a benzyl group, a cylco-hexyl group, —COO—, —O— or —CH$_2$—.

In the formula (I), B is selected form the group consisting of substituted or non-substituted 1,4-phenylenebis group, substituted or non-substituted diphenyl, and substituted or non-substituted 2,6-2-Naphthalenyl.

In the formula (I) or (II), m represents —COO—, —O— or —CH$_2$—.

In the formula (I) or (II), n is a natural number.

In the formula (I) or (II), Y represents a substituted or non-substituted acrylate group, substituted or non-substituted methyl-acrylate group, substituted or non-substituted vinyl, substituted or non-substituted vinyloxy group, or substituted or non-substituted epoxy group. Further, Y can also be any group of the following formulas (Y1), (Y2), (Y3-1), (Y3-2), (Y4), (Y5), (Y6), (Y7), (Y8), (Y9), (Y9-1), (Y9-2), (Y10-1), (Y10-2) and (Y11):

(Y1)

(Y2)

(Y3-1)

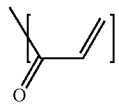

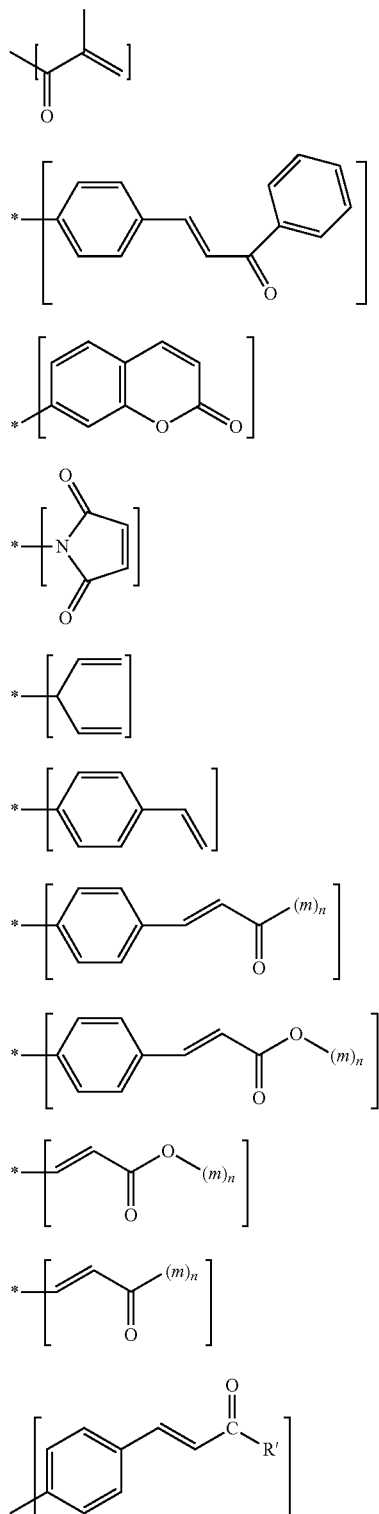

Herein, in the formula (Y9-1), (Y9-2), (Y10-1) or (Y10-2), m represents —COO—, —O— or —CH$_2$—, and n represents a natural number. In the formula (Y11), R' represents —O—C$_q$H$_{2q+1}$, q is 0 or an interger between 1 and 20, or R' represents one of the groups of the following formulas (Z1), (Z2), (Z3) and (Z4).

the curable parts comprises a partial structure comprising the following formula (III):

$$—(X1)_{n1}\text{-}(X2)_{n2}\text{-}(X3)_{n3}(L1)_{p1}\text{-}G\text{-}(L2)_{p2}\text{-}(X4)_{n4}\text{-}(X5)_{n5}\text{-}(X6)_{n6}\text{-}Y \quad (III)$$

a monovalent link is bonded to a main chain of a polymer;
X1, X2, X3, X4, X5 and X6 are the same or different, and each of X1, X2, X3, X4, X5 and X6 represents:

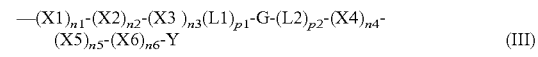

$r_1$, $r_2$, $r_3$ and $r_4$ are the same or different, and each of $r_1$, $r_2$, $r_3$ and $r_4$ represents H, F or Cl;
n1, n2, n3, n4, n5 and n6 are the same or different, each of n1, n2, n3, n4, n5 and n6 is 0 or a natural number, and n1+n2+n3<3 and n4+n5+n6≦3;
L1 and L2 are the same or different, and each of L1 and L2 represents —O—, —COO— or —C≡C—;

p1 and p2 are the same or different, and each of p1 and p2 is 0 or 1;

G represents

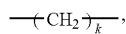

wherein k is 0 or a positive integer between 0 and 18; and

Y represents one of the groups of the following formulas (Y2-1), (Y3-3), (Y4-1), (Y5-1), (Y6), (Y7), (Y8), (Y9), (Y10), (Y11), (Y12), (Y13) and (Y14):

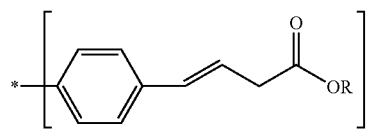 (Y2-1)

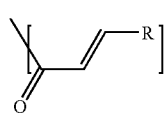 (Y3-3)

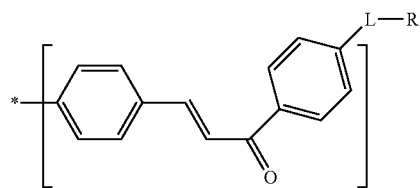 (Y4-1)

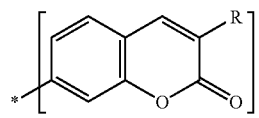 (Y5-1)

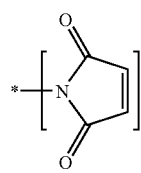 (Y6)

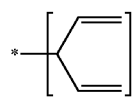 (Y7)

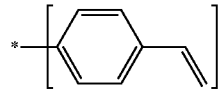 (Y8)

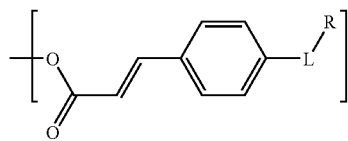 (Y9)

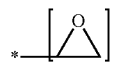 (Y10)

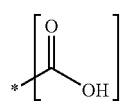 (Y11)

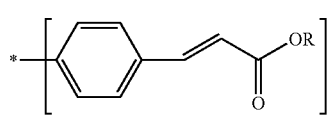 (Y12), (Y13)

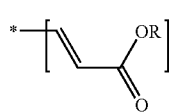 (Y14)

L represents —O—, —COO— or —C=C—, R represents H or alkyl group, $R_1$ and $R_2$ are the same of different, and each of $R_1$ and $R_2$ represents H or alkyl group.

curable parts further comprises a homeotropic alignment part comprising one of the following formula (IV) or (V):

$$-(L)_p-(X1)_{n1}-(X2)_{n2}-(X3)_{n3}-G \quad (IV)$$

$$-(L)_p-Q \quad (V)$$

a monovalent link is bonded to a main chain of a polymer;

L represents —O—, —COO— or —C=C—;

p is 0 or 1;

X1, X2 and X3 are the same or different, and each of X1, X2 and X3 represents:

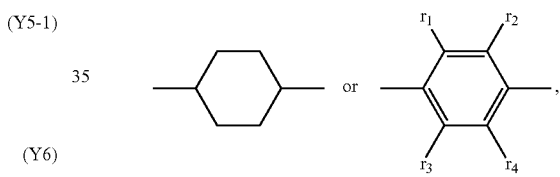

wherein $r_1$, $r_2$, $r_3$ and $r_4$ are the same or different, and each of $r_1$, $r_2$, $r_3$ and $r_4$ represents H, F or Cl;

n1, n2 and n3 are the same or different, each of n1, n2 and n3 is 0 or a natural number, and n1+n2+n3≦3;

G represents

—(CH$_2$)$_k$—, wherein k is 0 or a positive integer between 0 and 18; and

Q represents one of the groups of the following formulas (Q1), (Q2), (Q3) and (Q4):

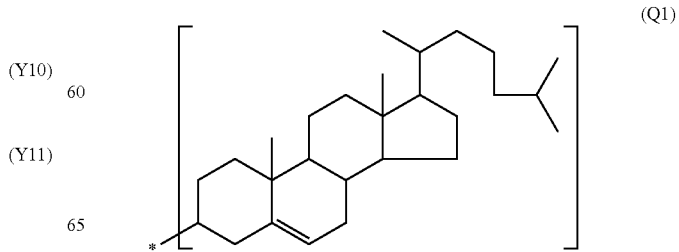 (Q1)

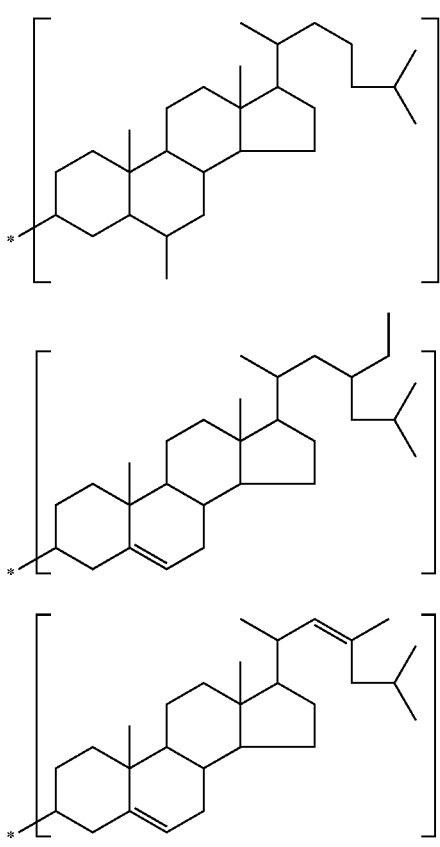

an alignment film, comprise: a photo alignment material; and a homeotropic alignment material, wherein the homeotropic alignment material is 1% to 4% of the composition.

The photo-alignment material comprises curable parts with a partial structure comprising one of the following formulas (Y1), (Y2), (Y3-1), (Y3-2), (Y4), (Y5), (Y6), (Y7), (Y8), (Y9-1), (Y9-2), (Y10-1), (Y10-2), (Y11):

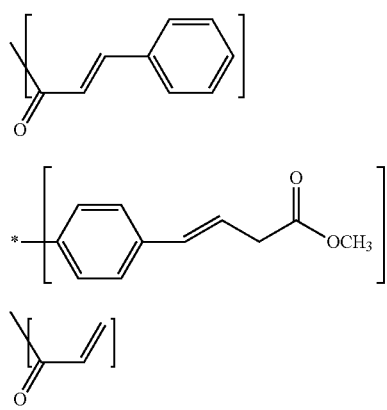

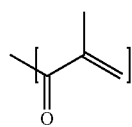

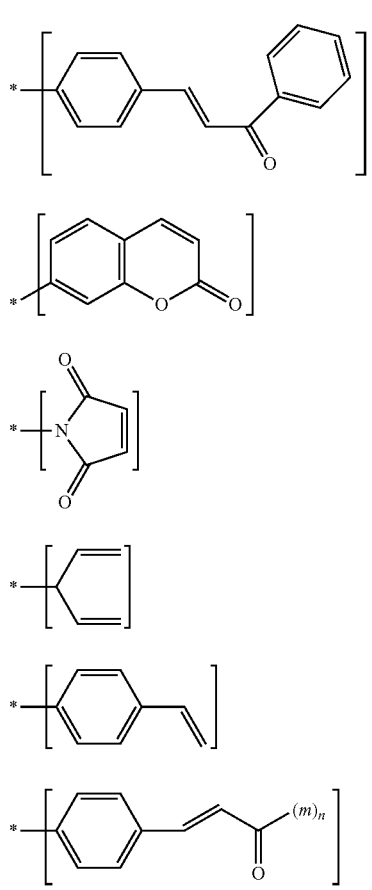

wherein, in the formula (Y9-1), (Y9-2), (Y10-1) or (Y10-2), m represents —COO—, —O— or —CH$_2$—, and In the formula (Y9-1), (Y9-2), (Y10-1) or (Y10-2), n represents a natural number;

In the formula (Y11), R' represents —O—C$_q$H$_{2q+1}$, q is 0 or interger between 1 and 20, or R' represents one of the groups of the following formulas (Z1), (Z2), (Z3) and (Z4):

(Z1)

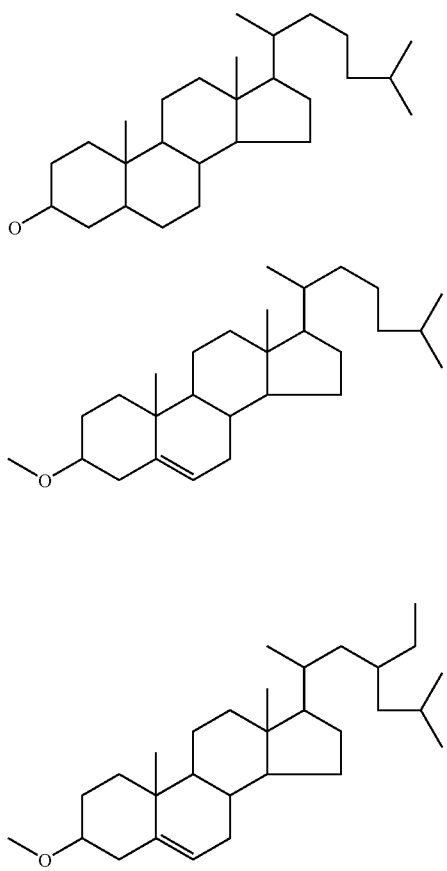

(Z2)

(Z3)

(Z4)

The homeotropic alignment material comprises a plurality of molecules with a homeotropic alignment property, and the molecule has a partial structure comprising one of the following formulas (V1), (V2), (V3) and (V4):

V1

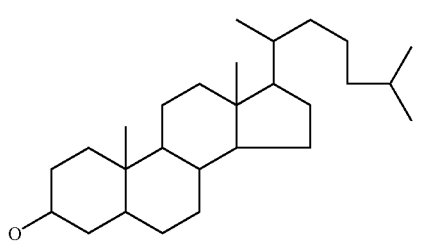

V2

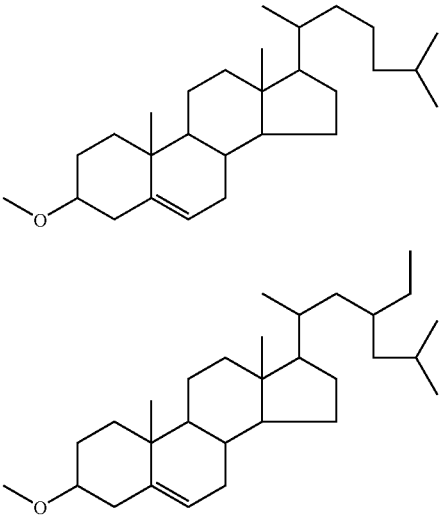

V3

V4

BRIEF DESCRIPTION OF THE DRAWINGS

The embodiments will become more fully understood from the detailed description and accompanying drawings, which are given for illustration only, and thus are not limitative thereof, and wherein.

DETAILED DESCRIPTION OF THE EMBODIMENTS

The merits and advantages of the various embodiments will be apparent from the following detailed description, which proceeds with reference to the accompanying drawings, wherein the same references relate to the same elements.

These and other features, aspects and advantages of the embodiments will become better understood with regard to the following description, appended claims, and accompanying drawings. Although the present embodiments can be described in considerable detail with reference to certain preferred configurations thereof, the following description and accompanying drawings only refer to a limited number of embodiments and the disclosure is not limiting to the scope protection to which this application is entitled.

The embodiments relate to a method for alignment treatment of a substrate for a LCD device, which includes the following steps of: forming an alignment film having a plurality of molecules with curable part on a substrate; applying an electrical field to the substrate to rotate the curable parts; and curing the curable parts such that the curable parts are cured along a first direction. In more detail, the curable parts are irradiated with light or heated while applying an electrical field to the substrate, so that at least two adjacent curable parts are cross-linked, thereby producing an alignment film with a homogeneous alignment property. The alignment film can be formed on the substrate by spin coating or printing.

In addition, the substrate has a pixel electrode, which includes a plurality of slits used as domain regulators (viz., orientation regulating means) for regulating the orientation of the liquid crystal layer. When applying the electrical field to the substrate to rotate the curable parts, the curable parts are tilted in a plurality of directions. Then, the curable parts are cured, so that the alignment film has the multi-domain alignment property. The substrate also can have complete pixel electrode without slits. The substrate is placed in a chamber with pattern electrode. When the electric field formed between the pattern electrode and the pixel electrode without slits rotates the curable parts, the curable parts are tilted in a plurality of directions. Then, the curable parts are cured, so that the alignment film has the multi-domain alignment property.

Figure 3:
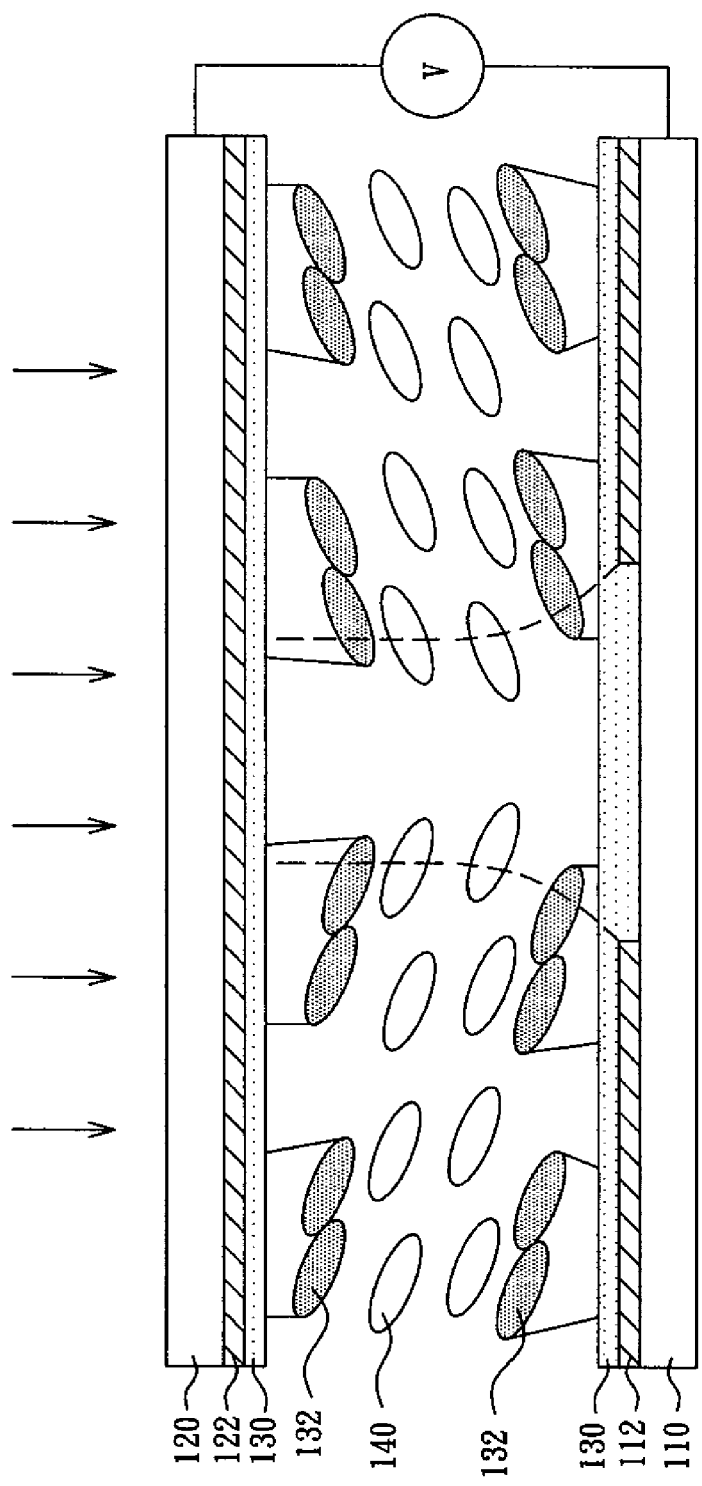
Figure 7:
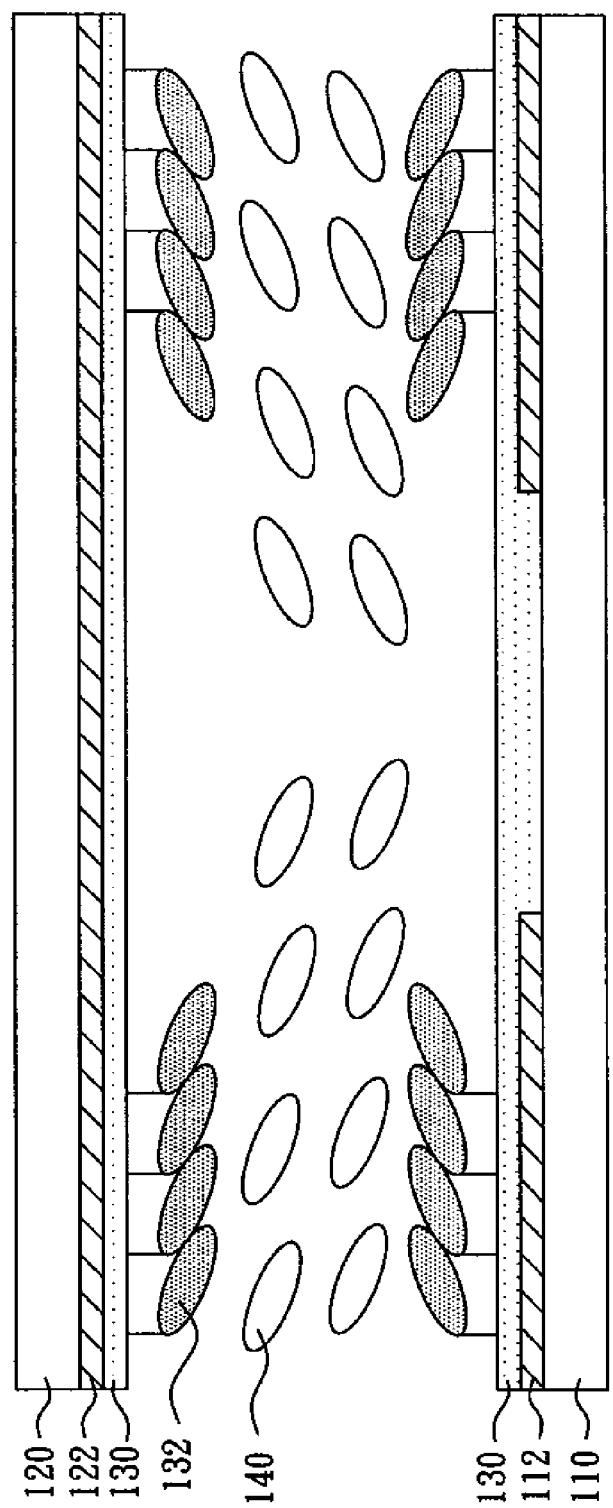
FIG. 7 is a sectional illustration showing the main step of the manufacturing method of a LCD device according to one embodiment.

The above-mentioned curing step can be performed by using a light curing process (e.g. irradiating the curable parts with UV light) or a thermal curing process (e.g. heating the curable parts). In the embodiment, the curable parts therefore may have either or both of a UV-light curable part and a thermal curable part. During the process of applying energy to cure the curable parts 132, a reaction will occur between two adjacent curable parts 132, which have the same tilting direction, so that the two adjacent curable parts 132 become cross-linked. This reaction can be a cycloaddition (as shown in FIG. 3) or a polymerization of functional groups (as shown in FIG. 7).

The alignment film may include a first polymer formed by polymerizing monomers with curable part, and a curable part with a vertical alignment function. The curable part can be extended from the main chain of the first polymer or located on the main chain of the first polymer. Otherwise, the curable parts can be extended from and located on the main chain of the first polymer, respectively. Further, the first polymer may further include monomers with another curable part, and this curable part can be extended from or located on the main chain of the first polymer.

The alignment film may include a first polymer with the vertical alignment property and a second polymer, wherein the second polymer is formed by polymerizing monomers with the curable part. The curable parts can be extended from or located on the main chain of the second polymer. Otherwise, the curable parts can be extended from and located on the main chain of the first polymer, respectively. Further, the curable parts of the first polymer and the curable parts of the second polymer may be the same or different. The first and second polymers can form the vertical alignment film by doping or co-polymerization.

In one embodiment, the suitable curable side chains may have the curable part as the following formula (I) or (II):

$$—X—F—B\text{-}(m)_n\text{-}G\text{-}Y \qquad (I)$$

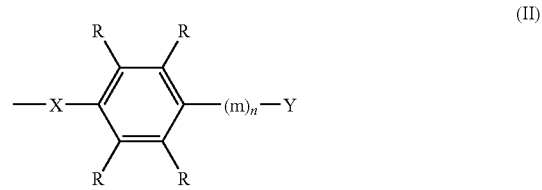
(II)

The monovalent link in the formula (I) or (II) is bonded to the main chain of the polymer.

In the formula (I), F represents

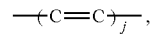

wherein j is 0 or a positive integer between 0 and 2.

In the formula (I), G represents

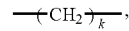

wherein k is 0 or a positive integer between 0 and 11.

In the formula (I) or (II), X represents a benzyl group, a cylco-hexyl group, —COO—, —O— or —CH$_2$—.

In the formula (I), B is selected form the group consisting of substituted or non-substituted 1,4-phenylenebis group, substituted or non-substituted diphenyl, and substituted or non-substituted 2,6-2-Naphthalenyl.

In the formula (I) or (II), m represents —COO—, —O— or —CH$_2$—.

In the formula (I) or (II), n is a natural number.

In the formula (I) or (II), Y represents substituted or non-substituted acrylate group, substituted or non-substituted methyl-acrylate group, substituted or non-substituted vinyl, substituted or non-substituted vinyloxy group, or substituted or non-substituted epoxy group. Further, Y can also be one of the following formulas (Y1), (Y2), (Y3-1), (Y3-2), (Y4), (Y5), (Y6), (Y7), (Y8), (Y9-1), (Y9-2), (Y10-1) (Y10-2) and (Y11):

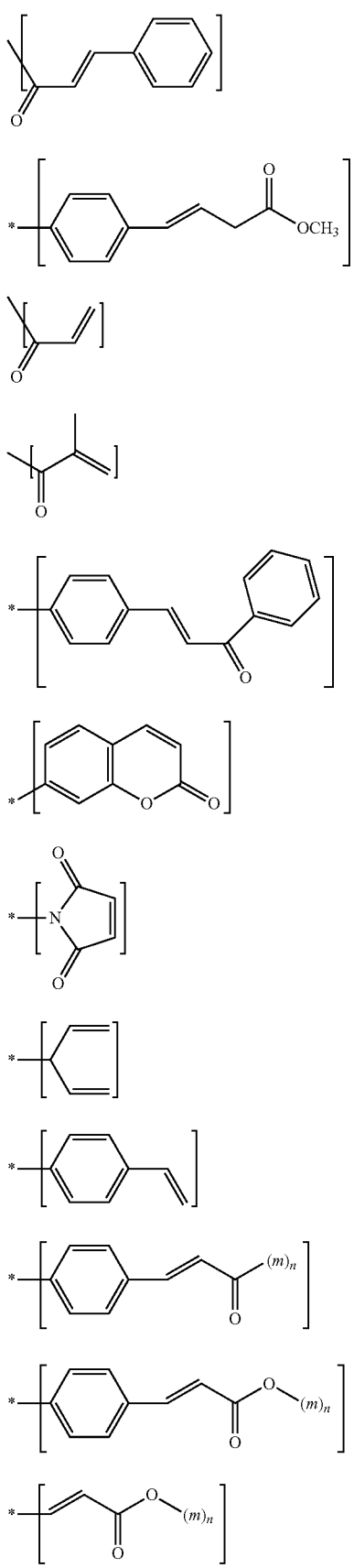
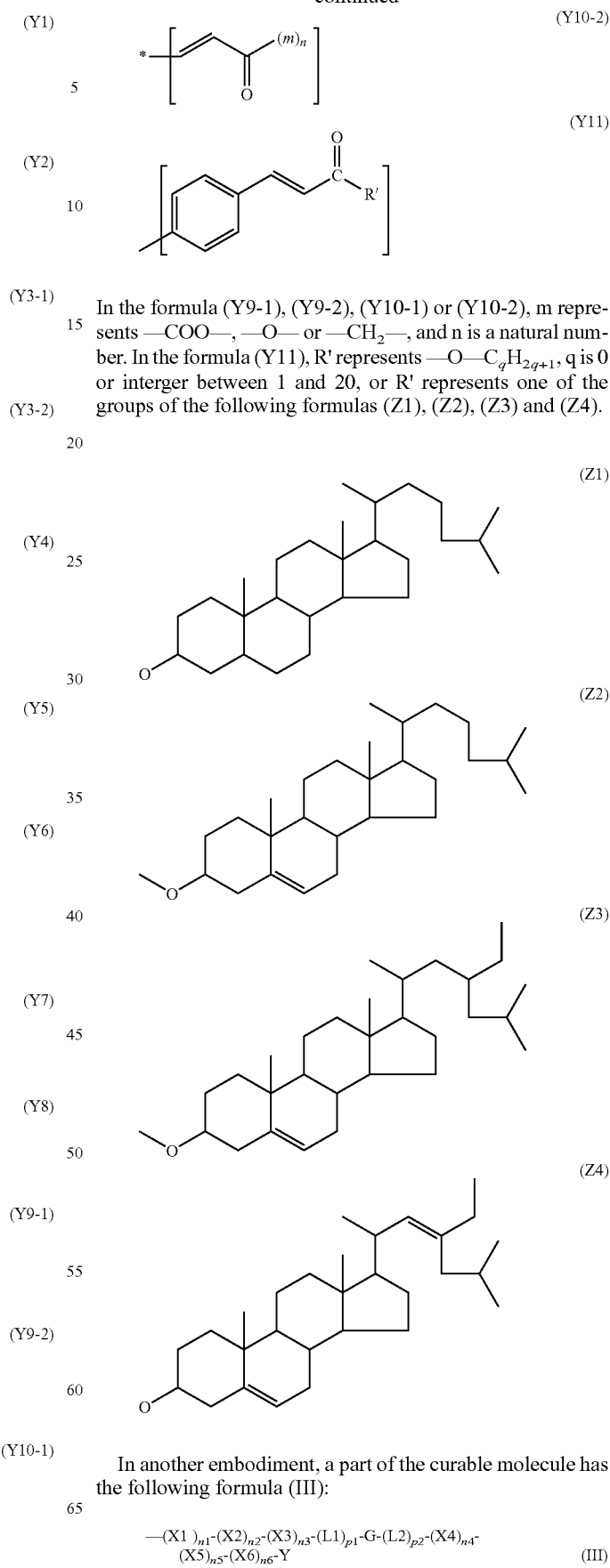
In the formula (Y9-1), (Y9-2), (Y10-1) or (Y10-2), m represents —COO—, —O— or —CH$_2$—, and n is a natural number. In the formula (Y11), R' represents —O—C$_q$H$_{2q+1}$, q is 0 or interger between 1 and 20, or R' represents one of the groups of the following formulas (Z1), (Z2), (Z3) and (Z4).
In another embodiment, a part of the curable molecule has the following formula (III):
—(X1)$_{n1}$-(X2)$_{n2}$-(X3)$_{n3}$-(L1)$_{p1}$-G-(L2)$_{p2}$-(X4)$_{n4}$-(X5)$_{n5}$-(X6)$_{n6}$-Y    (III)

In the formula (III), a monovalent link is bonded to a main chain of a polymer.

In the formula (III), X1, X2, X3, X4, X5 and X6 are the same or different, and each of X1, X2, X3, X4, X5 and X6 represents:

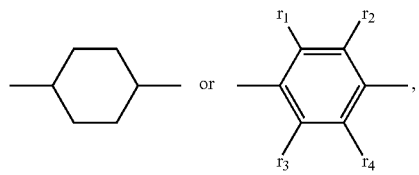

wherein $r_1$, $r_2$, $r_3$ and $r_4$ are the same or different, and each of $r_1$, $r_2$, $r_3$ and $r_4$ represents H, F or Cl.

In the formula (III), n1, n2, n3, n4, n5 and n6 are the same or different, each of n1, n2, n3, n4, n5 and n6 is 0 or a natural number, and n1+n2+n3≦3 and n4+n5+n6≦3.

In the formula (III), L1 and L2 are the same or different, and each of L1 and L2 represents —O—, —COO— or —C=C—.

In the formula (III), p1 and p2 are the same or different, and each of p1 and p2 is 0 or 1.

In the formula (III), G represents

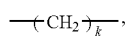

wherein k is 0 or a positive integer between 0 and 18.

In the formula (III), Y represents one of the groups of the following formulas (Y2-1), (Y3-3), (Y4-1), (Y5-1), (Y6), (Y7), (Y8), (Y9), (Y10), (Y11), (Y12), (Y13) and (Y14):

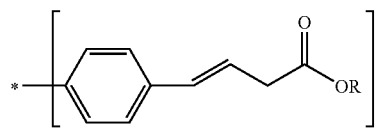
(Y2-1)

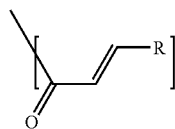
(Y3-3)

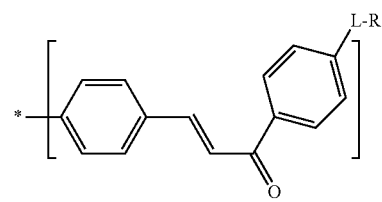
(Y4-1)

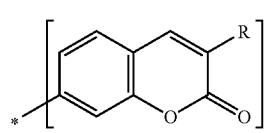
(Y5-1)

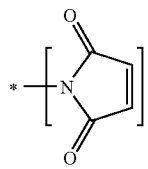
(Y6)

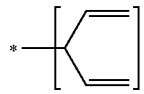
(Y7)

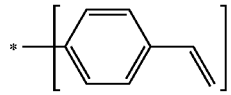
(Y8)

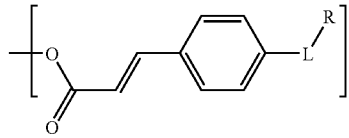
(Y9)

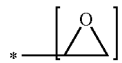
(Y10)

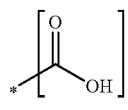
(Y11)

(Y12)

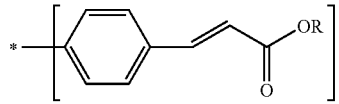
(Y13)

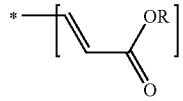
(Y14)

Herein, L represents —O—, —COO— or —C=C—, R represents H or alkyl group, $R_1$ and $R_2$ are the same of different, and each of RI and $R_2$ represents H or alkyl.

It should be noted that the curable molecule of the embodiments may have both a UV-light curable part (e.g. the ending group of the formula including (Y2-1), (Y3-3), (Y4-1), (Y5-1), (Y6), (Y7), (Y8), (Y9) or (Y10)) and a thermal curable part (e.g. the ending group of the formula including (Y10), (Y11) or (Y12)). After the alignment film composition having the molecules with curable parts is coated on a substrate, a baking step is performed to remove the solvent of the alignment film composition. At the same time, the thermal curable parts are cured and cross-linked with each other, thereby increasing the curing ratio so as to enhance the stability of the film. It is understood that, in the later step of applying the electrical field to the substrate, the UV-light curable parts, which are not cured by heat, can be affected and rotated by an electrical field. Then, in the following UV-light curing process, the rotated UV-light curable parts can be cured while oriented in a predetermined direction.

The predetermined direction may be substantially in the plane which is parallel to the substrate.

In another embodiment, the curable molecule has a side chain of the following formula (IV) or (V) for providing the homeotropic alignment property. The formulas (IV) and (V) are as follow:

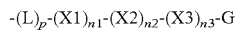 (IV)

-(L)p-Q (V)

In the formula (IV) or (V), a monovalent link is bonded to a main chain of a polymer.

In the formula (IV) or (V), L represents —O—, —COO— or —C=C—.

In the formula (IV) or (V), p is 0 or 1.

In the formula (IV), X1, X2 and X3 are the same or different, and each of X1, X2 and X3 represents:

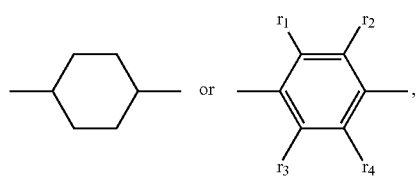

wherein $r_1$, $r_2$, $r_3$ and $r_4$ are the same or different, and each of $r_1$, $r_2$, $r_3$ and $r_4$ represents H, F or Cl.

In the formula (IV), n1, n2 and n3 are the same or different, each of n1, n2 and n3 is 0 or a natural number, and n1+n2+n3≦3.

In the formula (IV), G represents

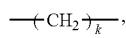

wherein k is 0 or a positive integer between 0 and 18.

In the formula (V), Q represents one of the groups of the following formulas (Q1), (Q2), (Q3) and (Q4):

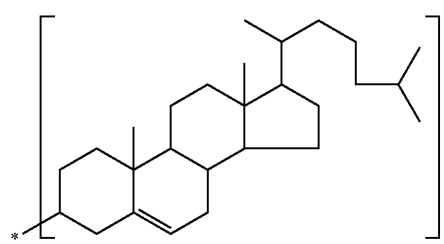 (Q1)

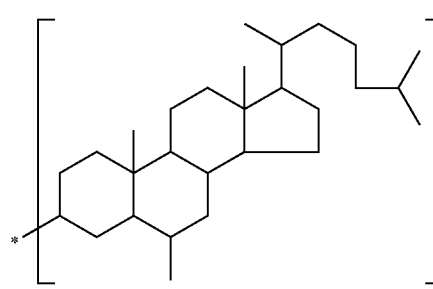 (Q2)

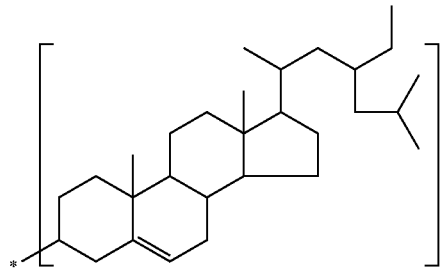 (Q3)

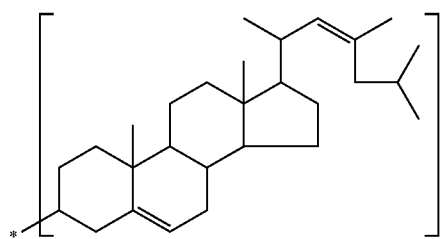 (Q4)

The surface energy of the alignment film in an MVA (multi-domain vertically alignment) type LCD device is generally between 35 mN/cm and 43 mN/cm. If the surface energy of the alignment film is greater than 43 mN/cm, the liquid crystal alignment may deteriorate under the electrical field. If the surface energy of the alignment film is smaller than 35 mN/cm, the printing property of the alignment film may be degraded. Accordingly, in a specific embodiment, the curable molecule for forming the alignment film of the MVA type LCD device may include a curable part (e.g. a side chain of the formula (III)) and a homeotropic alignment part (e.g. a side chain of the formula (IV) or (V)). In this embodiment, the alignment film with the desired surface energy can be produced by adjusting the ratios of the homeotropic alignment parts and the curable parts in the curable molecule.

In the conventional MVA type LCD device, it is necessary to dispose domain regulators (orientation regulating means) on the top substrate (CF substrate) and the bottom substrate (TFT substrate), respectively, to regulate the orientation of the liquid crystal layer. Thus, the aligning error must be considered when combining the top and bottom substrates. However, according to the manufacturing method of an MVA type LCD device of one or more of the embodiments, if the bottom substrate has the COA (Color Filter on Array) design, and the top substrate is a non-patterned ITO substrate, it is unnecessary to consider the aligning error when combining the top and bottom substrates. Thus, the MVA type LCD device of the embodiments can use a less expensive soda-lime glass substrate as the top substrate.

This application further discloses a manufacturing method of a LCD device, which includes the following steps of: forming an alignment film including a plurality of molecules with curable part on a first substrate; applying an electrical field to the alignment film to rotate the curable part; curing the curable part disposed on the first substrate such that the curable parts are cured along a first direction; repeating the above steps to treat a second substrate such that the curable parts disposed on the second substrate are cured along a second direction; after the curing steps, combining the first substrate and the second substrate; and forming a liquid crystal layer between the first substrate and a second substrate. When using this method to manufacture a TN (twisted nematic) type LCD device, the first direction is approximately perpendicular to the second direction. When using this method to manufacture an IPS (in-plane switch) type LCD device, the first direction and the second direction are approximately the same.

Figure 10:
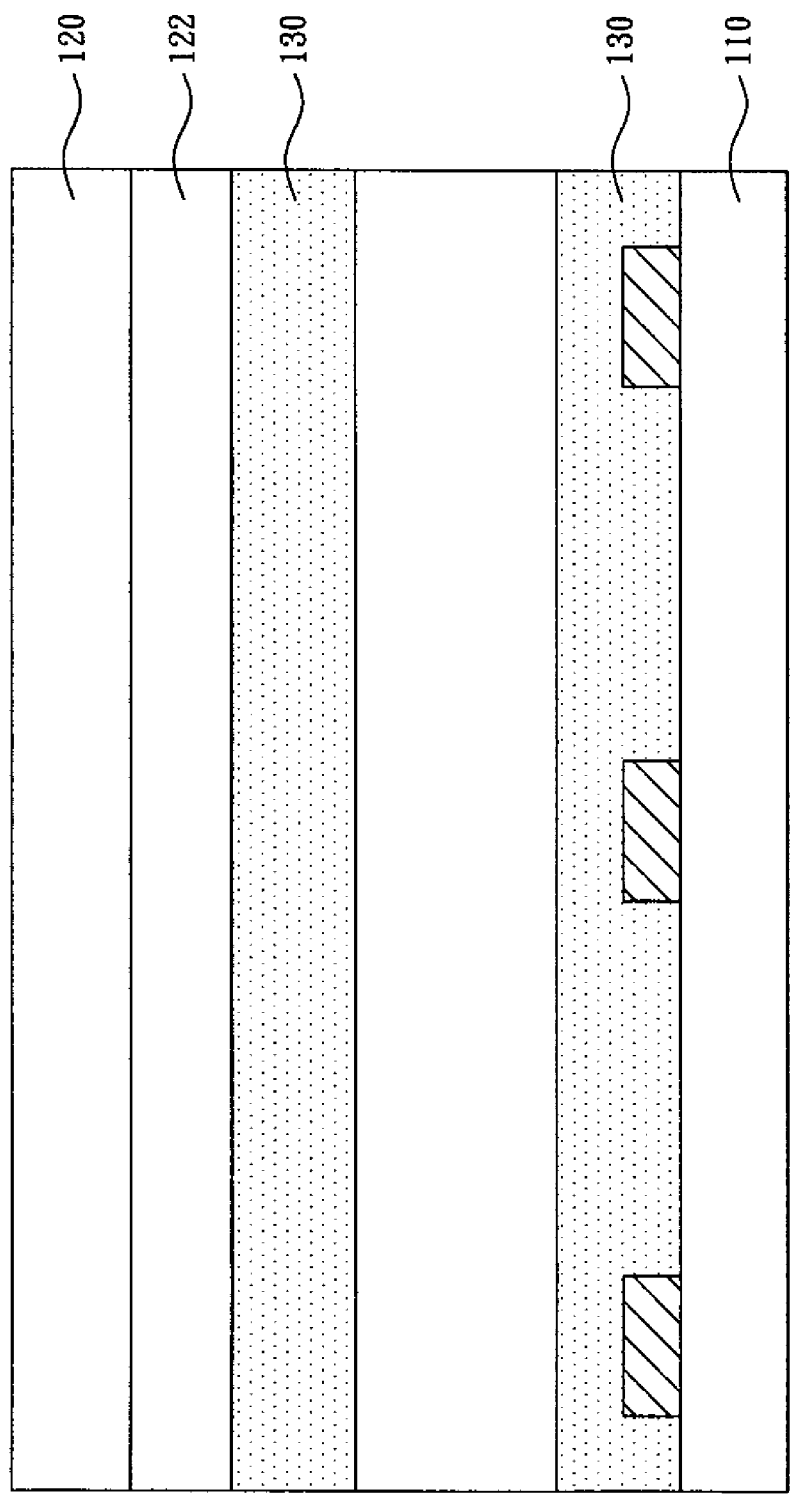
FIG. 10 is a sectional illustration showing the main step of the manufacturing method of a LCD device according to another embodiment.

With reference to FIG. 10, the present application further discloses a manufacturing method of a LCD device, which includes the following steps of: forming alignment films 130 including a plurality of molecules with curable parts on a top substrate 110 and a bottom substrate 120, respectively; combining the top substrate 110 and the bottom substrate 120; applying an electrical field to the alignment films 130 to rotate the curable parts; and curing the curable parts disposed on the substrates 110 and 120. Then, the combined substrates 110 and 120 and a liquid crystal container, which contains a liquid crystal composition, are disposed in a vacuum chamber. At this moment, the gap between the combined substrates 110 and 120 is in vacuum. After that, an input of the combined substrates is moved toward the liquid crystal container to contact the liquid crystal composition. Then, the vacuum is removed, so that the liquid crystal material can be sucked into the gap through the input according to the capillary effect and the pressure difference between the inside and outside of the combined substrates.

In addition, the substrate has a pixel electrode, which includes a plurality of slits used as domain regulators (orientation regulating means) for regulating the orientation of the liquid crystal layer. When applying the electrical field to the substrate to rotate the curable parts, the curable parts are tilted towards a plurality of directions. Then, the curable parts are cured, so that the alignment film has the multi-domain alignment property.

The above-mentioned curing step can be performed by a light curing process (e.g. irradiating the curable parts with UV light) or a thermal curing process (e.g. heating the curable parts).

As shown in FIG. 3, during the process of applying energy to cure the curable parts 132, a reaction will occur between two adjacent curable parts 132, which have the same tilting direction, so that the two adjacent curable parts 132 are cross-linked. This reaction can be a cycloaddition (as shown in FIG. 3) or a polymerization of functional groups (as shown in FIG. 7). The homeotropic alignment films 130 can be respectively formed on the substrates 110 and 120 by spin coating or printing. The homeotropic alignment film 130 includes a first polymer with a homeotropic alignment property, and the first polymer can be formed by polymerization of monomers with the curable part. The curable part can be extended from or located on the main chain of the first polymer. Otherwise, the curable parts can be extended from and located on the main chain of the first polymer, respectively. In addition, the first polymer may further include monomers with another curable part, and the another curable part may be extended from or located on the main chain of the first polymer.

Alternatively, the homeotropic alignment film 130 may include a first polymer with the homeotropic alignment property and a second polymer. The second polymer can also be formed by polymerization of monomers with the curable part. The curable part can be extended from or located on the main chain of the second polymer. Otherwise, the curable part can be extended from and located on the main chain of the second polymer, respectively. The curable parts of the first and second polymers can be the same or different, and the first and second polymers form the homeotropic alignment film 130 by doping or co-polymerization.

The suitable curable part may be as the following formula (I) or (II):

(I)

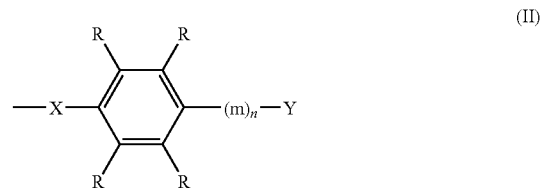

(II)

The monovalent link in the formula (I) or (II) is bonded to a main chain of the polymer.

In the formula (I), F represents

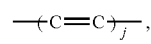

wherein j is 0 or a positive integer between 0 and 2.

In the formula (I), G represents

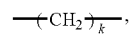

wherein k is 0 or a positive integer between 0 and 11.

In the formula (I) or (II), X represents a benzyl group, a cylco-hexyl group, —COO—, —O— or —CH$_2$—.

In the formula (I), B is selected form the group consisting of substituted or non-substituted 1,4-phenylenebis group, substituted or non-substituted diphenyl, and substituted or non-substituted 2,6-2-naphthalenyl.

In the formula (I) or (II), m represents —COO—, —O— or —CH$_2$—.

In the formula (I) or (II), n is a natural number.

In the formula (I) or (II), Y represents substituted or non-substituted acrylate group, substituted or non-substituted methyl-acrylate group, substituted or non-substituted vinyl, substituted or non-substituted vinyloxy group, or substituted or non-substituted epoxy group. Further, Y can also be any group of the following formulas (Y1), (Y2), (Y3-1), (Y3-2), (Y4), (Y5), (Y6), (Y7), (Y8), (Y9-1), (Y9-2), (Y10-1) and (Y10-2):

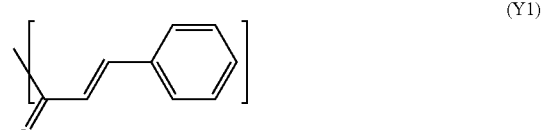

(Y1)

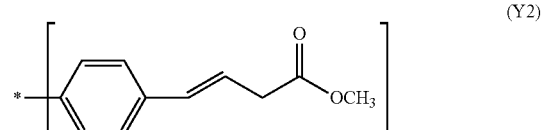

(Y2)

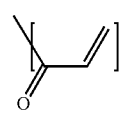

(Y3-1)

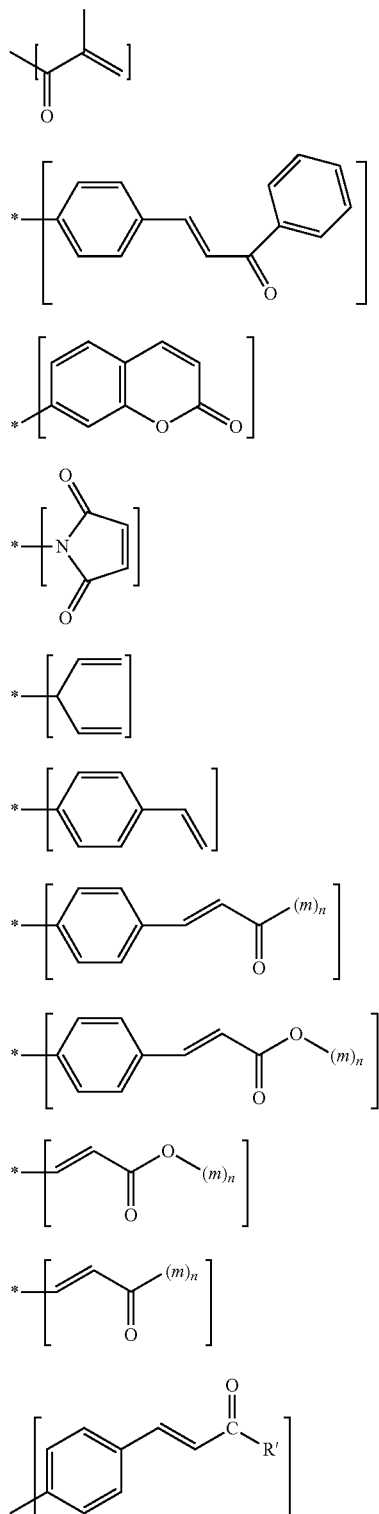

In the formula (Y9-1), (Y9-2), (Y10-1) or (Y10-2), m represents —COO—, —O— or —CH$_2$—, and n represents a natural number. In the formula (Y11), R' represents —O—C$_q$H$_{2q+1}$, q is 0 or interger between 1 and 20, or R' represents one of the groups of the following formulas (Z1), (Z2), (Z3) and (Z4).

This application also discloses a manufacturing method of a LCD device. The different between this and the previous methods is in that a liquid crystal layer is formed between the top and bottom substrates, then the electrical field is applied to the liquid crystal layer and the alignment film to rotate the liquid crystal molecules of the liquid crystal layer and the curable parts, and then the curable parts are cured.

The manufacturing method of an MVA (multi-domain vertically alignment) type LCD device according to the embodiments will be described herein below with reference to FIG. 1 to FIG. 4.

Figure 1:
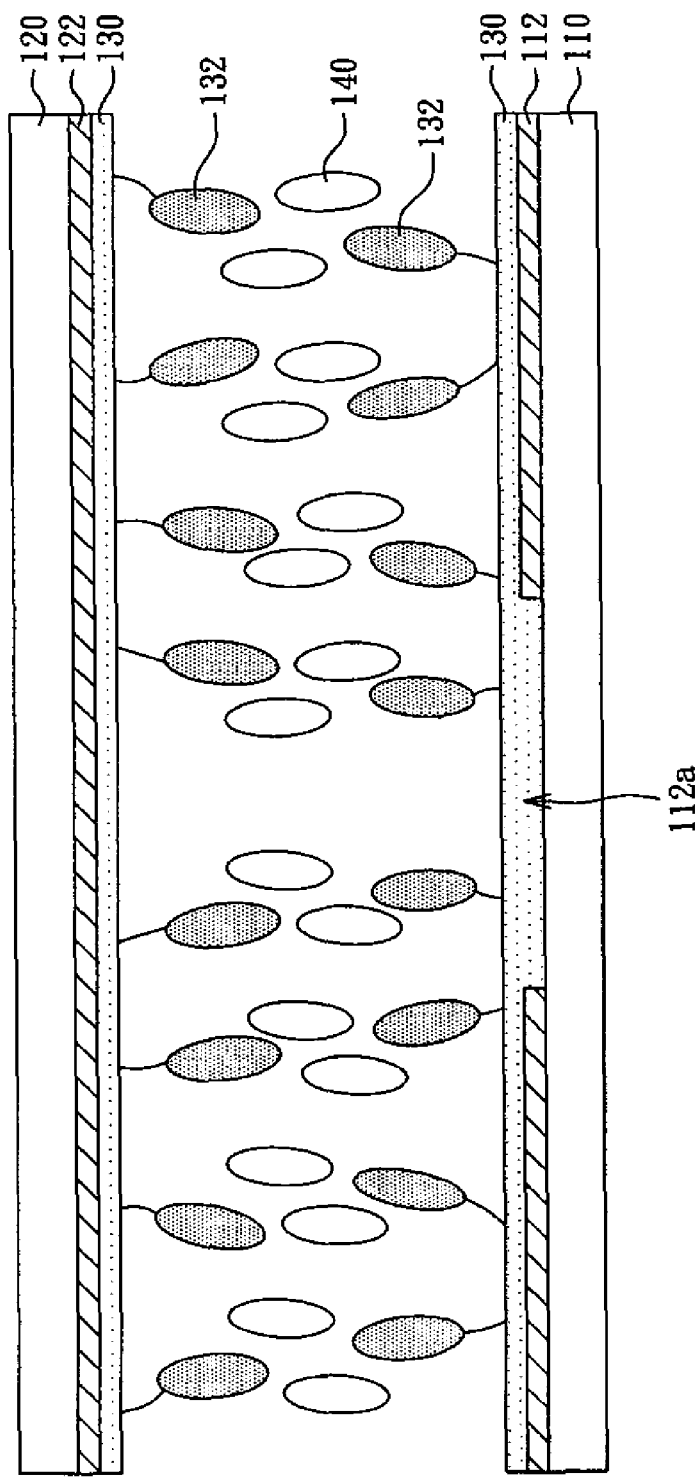
FIGS. 1 to 4 are sectional illustrations showing the main steps of the manufacturing method of a LCD device according to an embodiment.

Referring to FIG. 1, an MVA type LCD device mainly includes a first substrate 110 and a second substrate 120. A polarizing film (not shown) can be disposed on the outer surfaces of the first substrate 110 and the second substrate 120, respectively, for polarizing the visible light. A backlight (not shown) can be disposed behind the first substrate 110. For example, a backlight module can be installed behind the LCD device unit. A typical backlight module usually includes an optical cavity and a lighting unit such as a lamp, a LED or other light structure.

Figure 8:
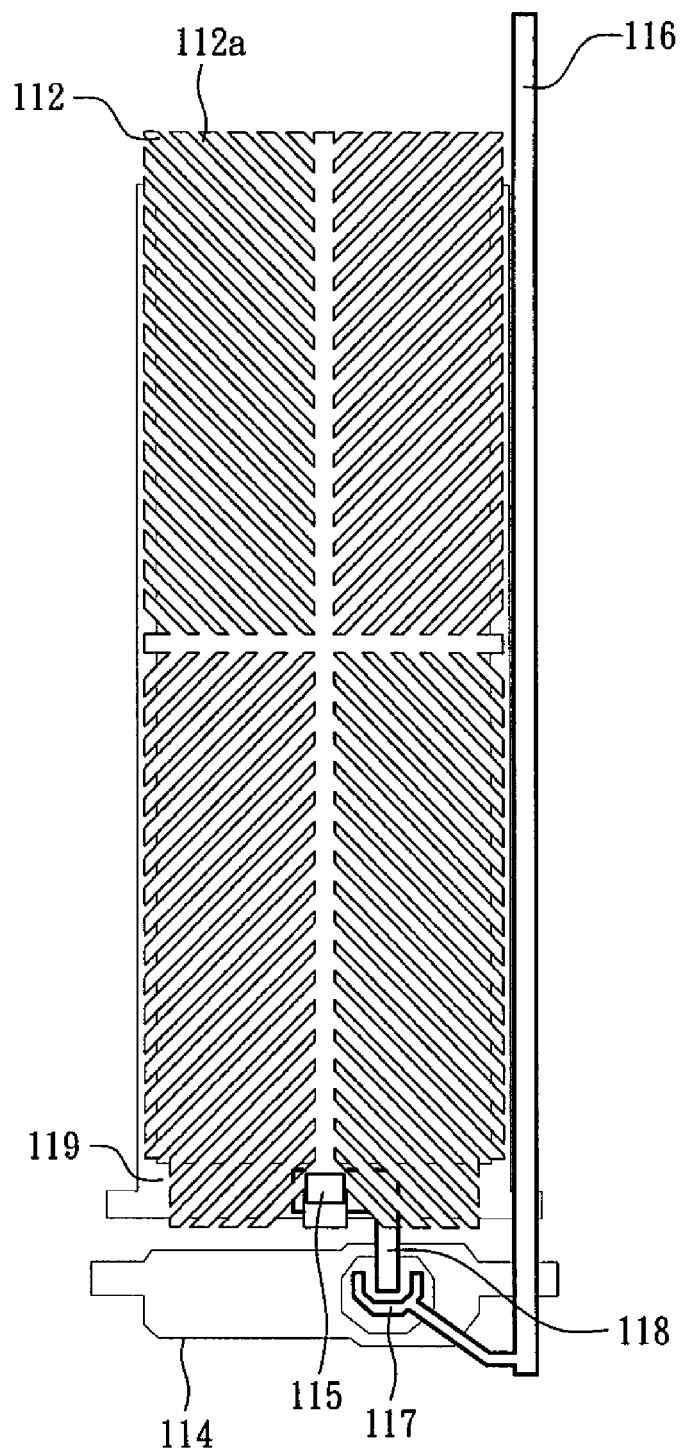
FIG. 8 is a schematic illustration showing a single pixel in an MVA type LCD device according to the above embodiment.

FIG. 8 is a schematic illustration showing a single pixel in an MVA type LCD device according to an embodiment. As shown in FIG. 8, a plurality of gate lines 114 and data lines 116 are disposed in matrix on the first substrate 110. The gate lines are usually parallel to each other and perpendicular to the data lines. The first substrate also has a plurality of thin-film transistors (TFT). The source 117 of the TFT is electrically connected to the data line 116, and the drain 118 of the TFT is electrically connected to the pixel electrode 112 through a via 115. The pixel electrodes 112 are arranged in matrix and located at the cross portions of the gate line 114 and the data lines 116. The first substrate may further have floating electrode lines 119, which are isolated and parallel to the data lines 114, for shielding the oblique leaked light so as to enhance the contrast. The second substrate 120 has a light shielding array such as a black matrix (not shown), a plurality of color filters and a common electrode 122. Alternatively, the color filters can also be formed on the first substrate, which has the TFTs. In general, the first substrate is called a TFT substrate, and the second substrate having the color filters is called a color filter (CF) substrate. A spacer (not shown) is disposed between the first and second substrates for defining the gap between the substrates. In the embodiment, the pixel electrode 112 has a plurality of slits 112a used as the domain regulators (orientation regulating means) for regulating the orientation of the liquid crystal layer. Therefore, when the voltage is applied, the liquid crystal molecules are obliquely aligned so that the orientations of the liquid crystal molecules have a plurality of directions, thereby achieving the wide view angle property. In addition, the pixel electrode 112 may have a herring-shaped slot 112b used as the domain regulators (orientation regulating means) (see FIG. 9). The surface of each of the first substrate 110 and the second substrate 120 has a homeotropic alignment film 130, which includes a plurality of curable parts 132. The homeotropic alignment film 130 can be formed on the substrates 110 and 120 by spin coating or printing. The homeotropic alignment film 130 includes a first polymer with a homeotropic alignment property, and the first polymer is formed by polymerization of monomers with the curable part. The curable part can be extended from or located on the main chain of the first polymer. Otherwise, the curable parts can be extended from and located on the main chain of the first polymer, respectively. In addition, the first polymer may further include monomers with another curable part, and the another curable part may be extended from or located on the main chain of the first polymer.

Alternatively, the homeotropic alignment film 130 may include a first polymer with the homeotropic alignment property and a second polymer. The second polymer can also be formed by polymerization of monomers with the curable part. The curable part can be extended from or located on the main chain of the second polymer. Otherwise, the curable parts can be extended from and located on the main chain of the second polymer, respectively. The curable parts of the first and second polymers can be the same or different, and the first and second polymers form the homeotropic alignment film by doping or co-polymerization.

The suitable curable parts may be as the following formula (I) or (II):

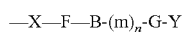  (I)

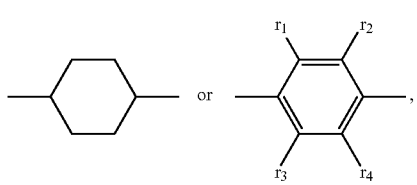

The monovalent link in the formula (I) or (II) is bonded to a main chain of the polymer.

In the formula (I), F represents

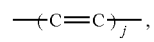

wherein j is 0 or a positive integer between 0 and 2.
In the formula (I), G represents

wherein k is 0 or a positive integer between 0 and 11.
In the formula (I) or (II), X represents a benzyl group, a cylco-hexyl group, —COO—, —O— or —CH$_2$—.

In the formula (I), B is selected form the group consisting of substituted or non-substituted 1,4-phenylenebis group, substituted or non-substituted diphenyl, and substituted or non-substituted 2,6-2-Naphthalenyl.

In the formula (I) or (II), m represents —COO—, —O— or —CH$_2$—.

In the formula (I) or (II), n is a natural number.

In the formula (I) or (II), Y represents substituted or non-substituted acrylate group, substituted or non-substituted methyl-acrylate group, substituted or non-substituted vinyl, substituted or non-substituted vinyloxy group, or substituted or non-substituted epoxy group. Additionally, Y can also be any group of the following formulas (Y1), (Y2), (Y3-1), (Y3-2), (Y4), (Y5), (Y6), (Y7), (Y8), (Y9-1), (Y9-2), (Y10-1), (Y10-2) and (Y11):

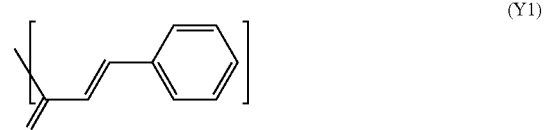 (Y1)

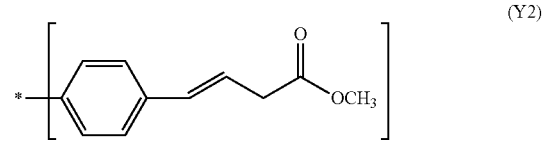 (Y2)

 (Y3-1)

 (Y3-2)

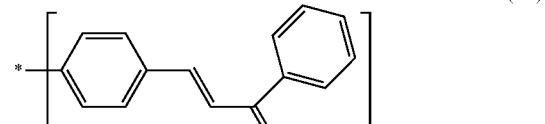 (Y4)

 (Y5)

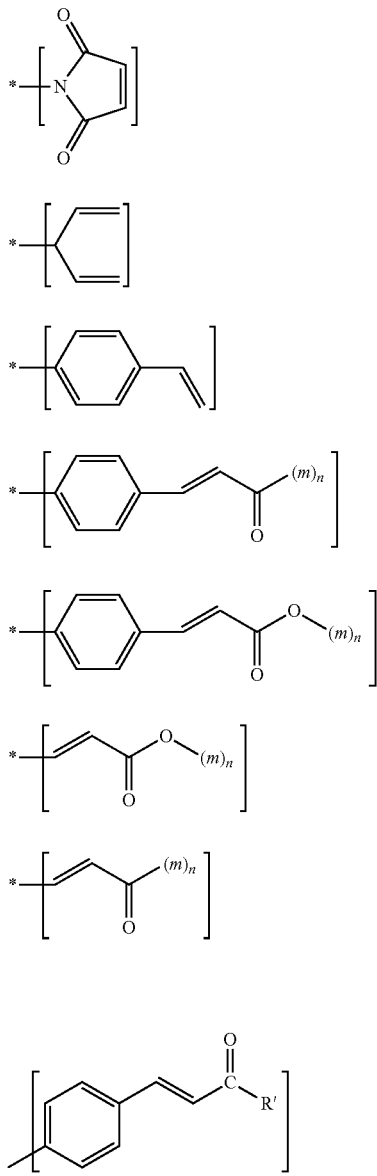

(Y6)
(Y7)
(Y8)
(Y9-1)
(Y9-2)
(Y10-1)
(Y10-2)
(Y11)

In the formula (Y9-1), (Y9-2), (Y10-1) or (Y10-2), m represents —COO—, —O— or —CH$_2$—, and n represents a natural number. In the formula (Y11), R' represents —O—C$_q$H$_{2q+1}$, q is 0 or interger between 1 and 20, or R' represents one of the groups of the following formulas (Z1), (Z2), (Z3) and (Z4).

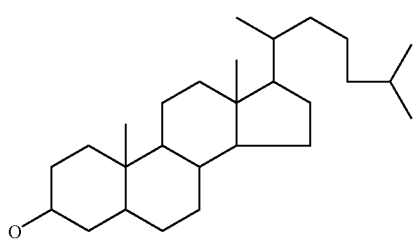

(Z1)

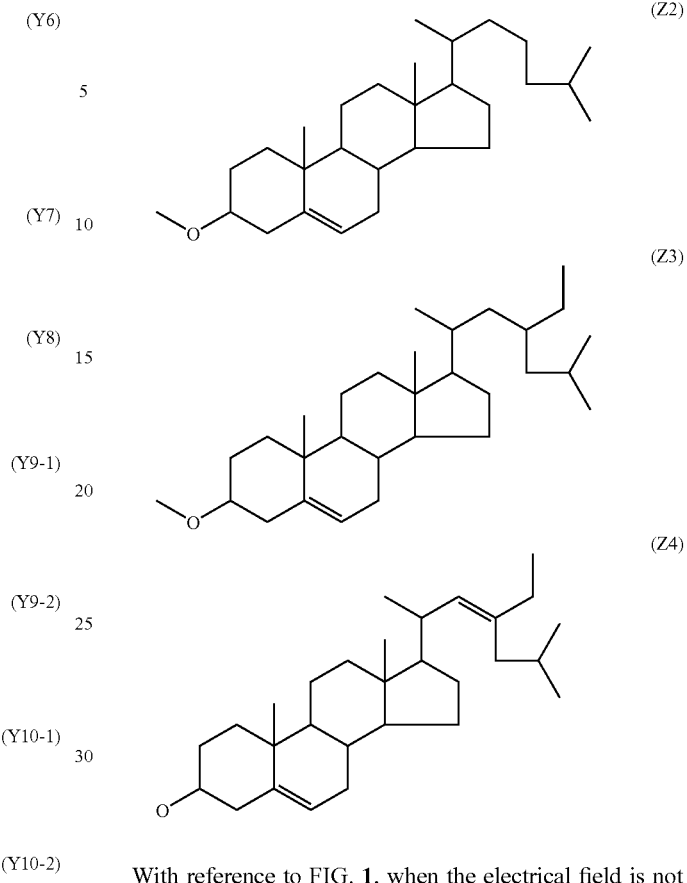

(Z2)
(Z3)
(Z4)

With reference to FIG. 1, when the electrical field is not applied, the homeotropic alignment film 130 can cause the liquid crystal molecules 140 to be approximately perpendicular to the surfaces of the first substrate 110 and the second substrate 120. Since the affinity exists between the curable parts and the liquid crystal molecules, each curable molecule will follow the tilting direction of the adjacent liquid crystal molecule.

Figure 2:
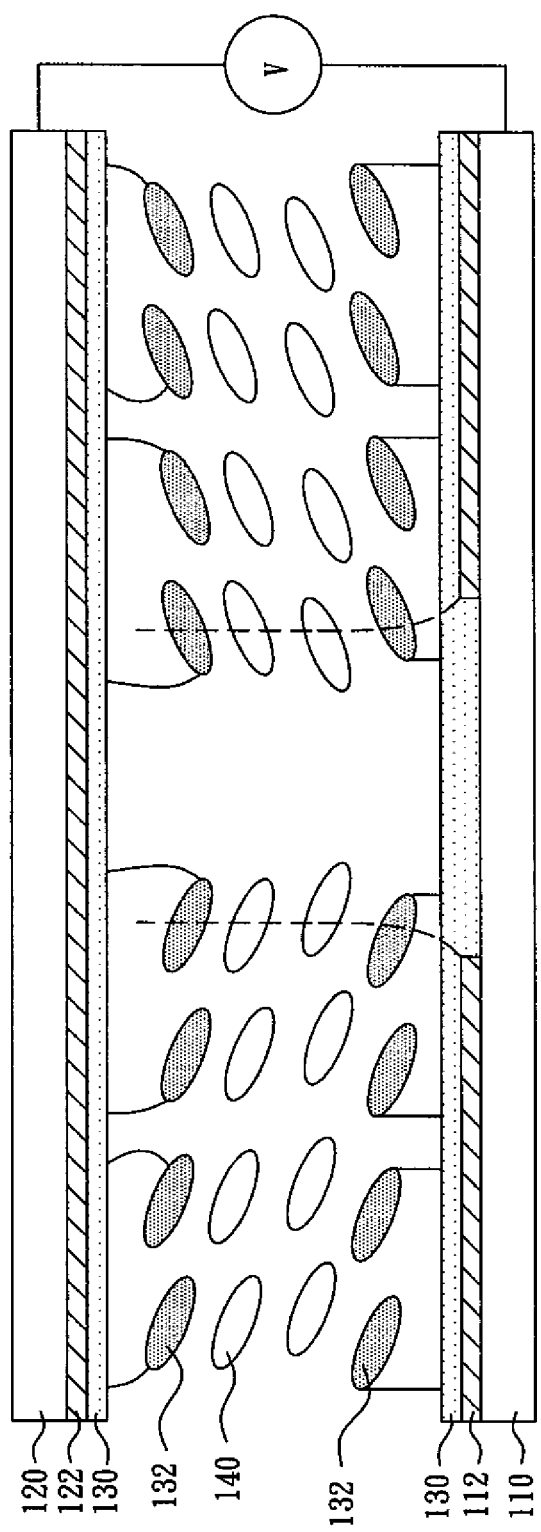

When a pre-determined voltage is applied, as shown in FIG. 2, the electrical field, which is oblique to the surface of the substrate as the dotted lines shown in FIG. 2, is generated near the slot 112a of the pixel electrode 112 (the edge of the electrode). The oblique electrical field determines the tilting direction of the liquid crystal molecule 140. As shown in FIG. 2, the orientations of the liquid crystal layer disposed between the first substrate 110 and the second substrate 120 are divided into two different directions. Since the affinity exists between the curable parts and the liquid crystal molecules, each curable molecule will follow the tilting direction of the adjacent liquid crystal molecule. Thus, the curable parts of FIG. 2 can be divided into two groups of different tilting directions.

The above-mentioned curing step can be performed by a light curing process (e.g. irradiating the curable parts with UV light) or a thermal curing process (e.g. heating the curable parts). During the process of applying energy to cure the curable parts 132, a reaction will occur between two adjacent curable parts 132, which have the same tilting direction, so that the two adjacent curable parts 132 are cross-linked. This reaction can be a cycloaddition (as shown in FIG. 3) or a polymerization of functional groups (as shown in FIG. 7).

Figure 4:
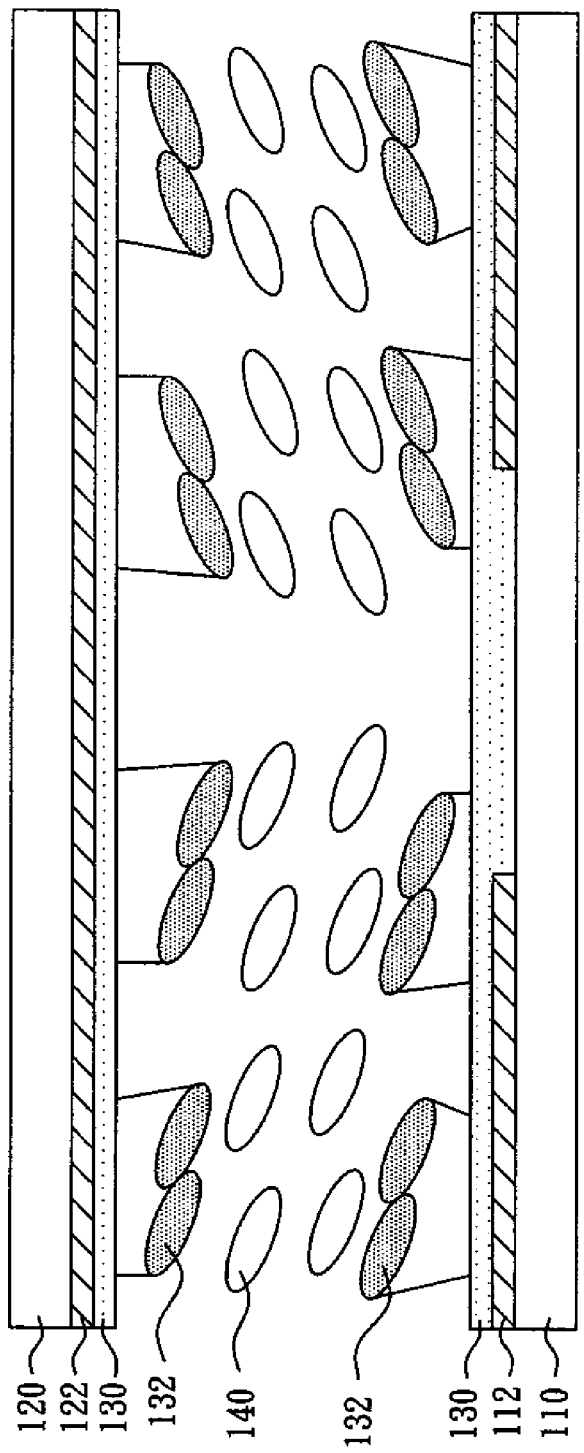

Accordingly, when the voltage is not applied, the above-mentioned cross-linked curable parts 132 can determine the alignment of the liquid crystal molecules 140, thereby stabilizing the pretilt angle and alignment of the liquid crystal molecules 140. As shown in FIG. 4, the orientations of the liquid crystal molecules are divided into two directions so as to achieve the wide view angle.

Compared with the conventional rubbing treatment, the alignment treatment method does not generate static electricity nor cause the above mentioned superficial blemishes, so that the product yield is not detrimentally affected. In addition, the alignment treatment method does not produce any residual particles, so the following cleaning step can be omitted, thereby reducing the manufacturing cost.

Figure 5:
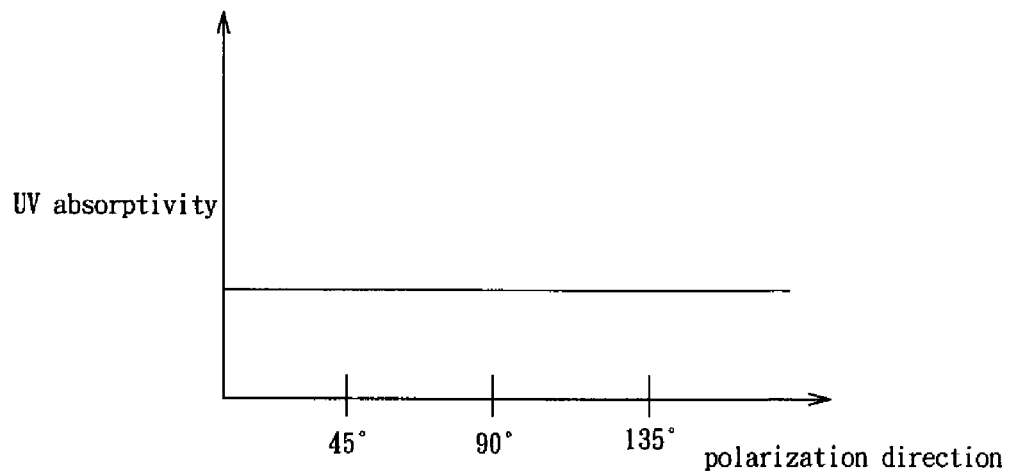
FIG. 5 is a graph showing the relationship between the absorptivity of the alignment film used in embodiments and the included angle between y axis and the polarization direction of the linear polarized light irradiating the alignment film.
Figure 6:
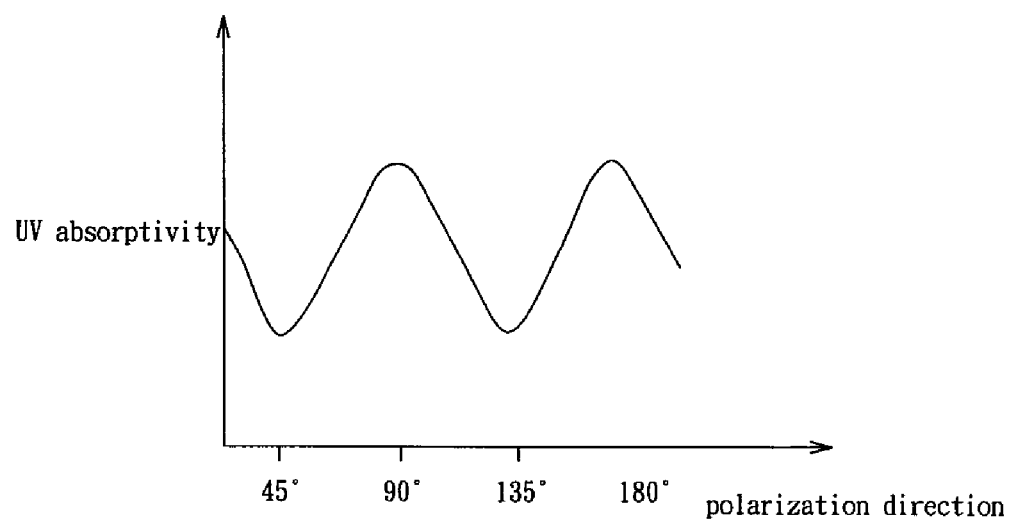
FIG. 6 is a graph showing the relationship between the absorptivity of the conventional alignment film and the included angle between y axis and the polarization direction of the linear polarized light irradiating the conventional alignment film.

Compared with the conventional photo alignment technology, the embodiments of the present invention utilizes the electrical field to perform the alignment treatment, and the UV light to cure the alignment film material, so the curing ratio may be greater than 50% or approach to 100%. In addition, the embodiments utilizes the electrical field to perform the alignment treatment, and the UV light is only used to cure the alignment film material, so the UV light is not necessary to have a specific polarization direction, and the molecules of the alignment film can be polymerized without directional selectivity. After the alignment treatment of the alignment film by the electrical field, another UV light with different polarization characteristics is applied to irradiate the alignment film again. Comparing the UV light absorbing frequencies of these two exposing processes, the absorption amounts in various polarized directions of the later UV light, which are absorbed by the alignment film, are approximately the same (see FIG. 5).

In addition, the above-mentioned alignment film can be formed by one of the following compositions, which mainly includes a photo-alignment material and a homeotropic alignment material. The photo alignment material includes curable parts, and the homeotropic alignment material is 1% to 4% of the composition. The homeotropic alignment material includes a plurality of molecules with the homeotropic alignment property, and the partial structure with the homeotropic alignment property can be one of the following formulas (V1), (V2), (V3) and (V4):

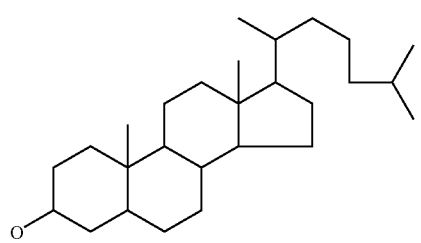

V1

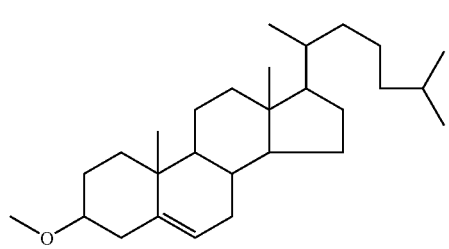

V2

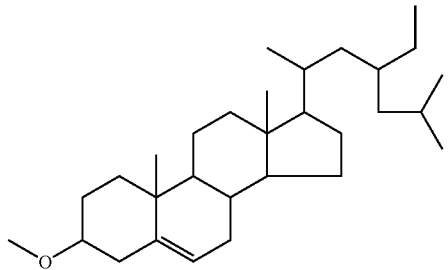

V3

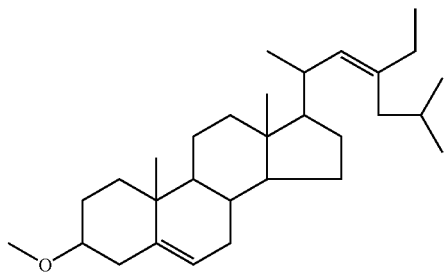

V4

The suitable curable parts of the embodiments may have be as the following formula (I) or (II):

$$-X-F-B-(m)_n-G-Y \quad (I)$$

(II)

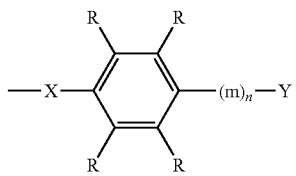

The monovalent link in the formula (I) or (II) is bonded to a main chain of the polymer.

In the formula (I), F represents $$-(C=C)_{\overline{j}}-,$$

wherein j is 0 or a positive integer between 0 and 2.
In the formula (I), G represents $$-(CH_2)_{\overline{k}}-,$$

wherein k is 0 or a positive integer between 0 and 11.

In the formula (I) or (II), X represents a benzyl group, a cylco-hexyl group, —COO—, —O— or —CH$_2$—.

In the formula (I), B is selected form the group consisting of substituted or non-substituted 1,4-phenylene group, substituted or non-substituted diphenyl group, and substituted or non-substituted 2,6-2-Naphthaleneyl.

In the formula (I) or (II), m represents —COO—, —O— or —CH$_2$—.

In the formula (I) or (II), n is a natural number.

In the formula (I) or (II), Y represents substituted or non-substituted acrylate group, substituted or non-substituted methyl-acrylate group, substituted or non-substituted vinyl, substituted or non-substituted vinyloxy group, substituted or non-substituted epoxy group. Further, Y can also be any group of the following formulas (Y1), (Y2), (Y3-1), (Y3-2), (Y4), (Y5), (Y6), (Y7), (Y8), (Y9-1), (Y9-2), (Y10-1), (Y10-2), and (Y11):
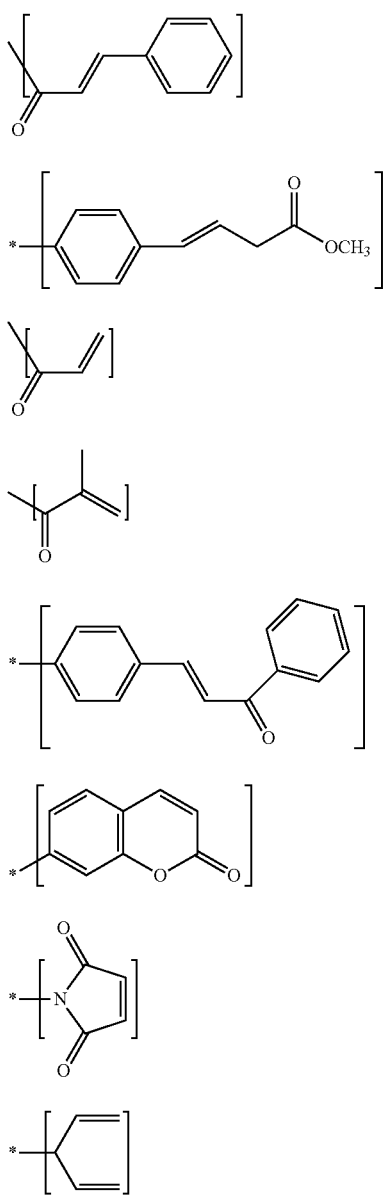
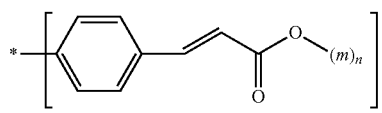
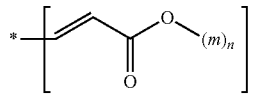
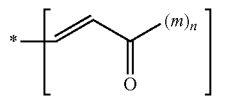
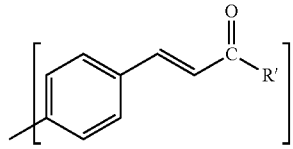
In the formula (Y9-1), (Y9-2), (Y10-1) or (Y10-2), m represents —COO—, —O— or —CH$_2$—, and n represents a natural number. In the formula (Y11), R' represents —O—C$_q$H$_{2q+1}$, q is 0 or interger between 1 and 20, or R' represents one of the groups of the following formulas (Z1), (Z2), (Z3) and (Z4).
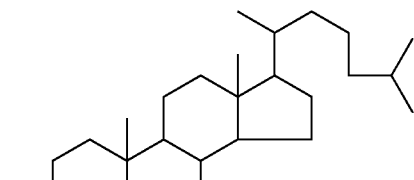
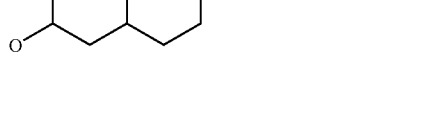
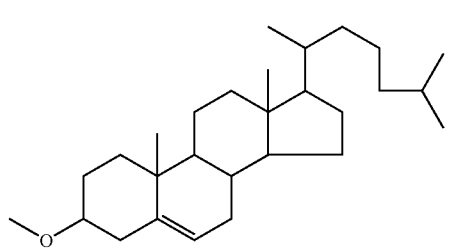
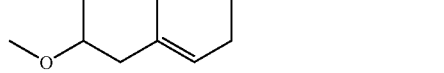
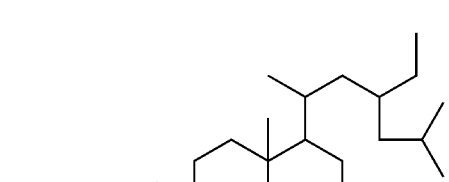
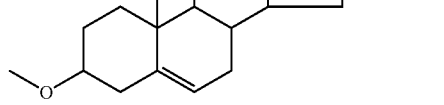

-continued (Z4)

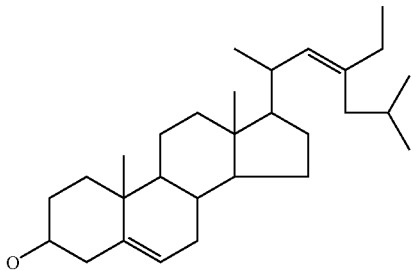

In the conventional photo align method, an UV light with a specific polarized direction (e.g. a direction having an included angle of 45° with y axis) is used to irradiate the alignment film, so that the alignment film can perform the photo chemical reaction with directional selectivity (the photo chemical reaction only occurs on those related to y axis). Thus, the molecules of the alignment film can be aligned in a specific direction. Accordingly, in the LCD device manufactured by the conventional photo align technology, the pretilt angle of the top substrate (CF substrate) is equal to that of the bottom substrate (TFT substrate).

On the contrary, in the LCD device manufactured by the method according to some embodiments disclosed in this application, the pretilt angles of the top and bottom substrates are different, so that the contrast can be increased, the response time can be reduced, and sufficient reliability can be obtained.

A LCD device according to an embodiment mainly includes a first alignment film disposed on a first substrate, a second alignment film disposed on a second substrate and a liquid crystal layer disposed between the first and second alignment films. The first and second alignment films are formed by a plurality of molecules with curable parts, which are cured under the electrical fields of different intensities. Thus, the ratio of the cured part in the first alignment film is different that in the second alignment film, so the pretilt angles of the first and second alignment films are different.

In addition, a LCD device according to another embodiment mainly includes a first alignment film disposed on a first substrate, a second alignment film disposed on a second substrate and a liquid crystal layer disposed between the first and second alignment films. The first and second alignment films are formed by a plurality of first molecules with curable parts and a plurality of second molecules with curable parts, respectively, which are cured under an electrical field. The curable part ratios of the first curable molecule and the second curable molecule are different, so that the pretilt angles of the first and second alignment films are different. Herein, the above-mentioned curable part ratio means the ratio of the curable part in the curable molecule.

Moreover, a LCD device according to another embodiment mainly includes a first alignment film disposed on a first substrate, a second alignment film disposed on a second substrate and a liquid crystal layer disposed between the first and second alignment films. The first and second alignment films are formed by a plurality of first molecules with curable parts and a plurality of second molecules with curable parts, respectively, which are cured under the electrical field. The first curable molecule has both of a curable part and a homeotropic alignment part, and the second curable molecule does not have the homeotropic alignment part. Otherwise, the first curable molecule and second curable molecule may both have a curable part and a homeotropic alignment part, and the ratios of the homeotropic alignment part in the first and second molecules with curable parts are different. Accordingly, the pretilt angles of the first and second alignment films are different.

Furthermore, a LCD device according to yet another embodiment mainly includes a first alignment film disposed on a first substrate, a second alignment film disposed on a second substrate and a liquid crystal layer disposed between the first and second alignment films. The first alignment film is formed by a plurality of first molecules with curable parts, which are cured under the electrical field. The second alignment film is a conventional homeotropic alignment film such as VAPI. Accordingly, the pretilt angles of the first and second alignment films are different.

Figure 11:
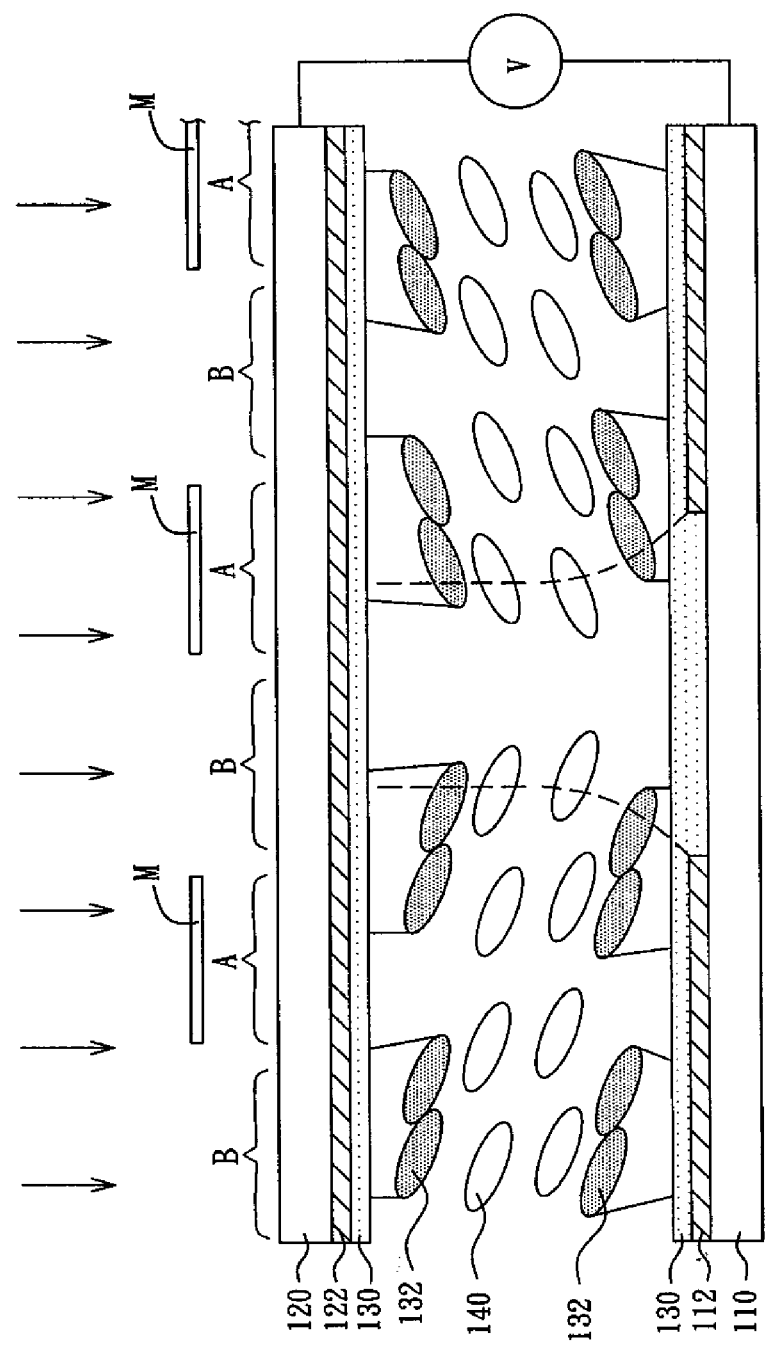
FIG. 11 is a sectional illustration showing the manufacturing method of a LCD device according to yet another embodiment of the present invention, which uses a mask to perform a light curing process.

Further the above-mentioned method that utilizes the slits of the pixel electrode to be the domain regulators so as to achieve the multi-domain alignment, can also utilize a mask M to achieve the multi-domain alignment (as shown in FIG. 11). As shown in FIG. 11, in the step of curing the curable parts, a mask M is disposed over the substrate 110 or 120 for blocking a part of the light, thereby forming the partial light curing. In this case, the curable parts in the area A of FIG. 11 are cured along a first direction. Then, another light curing process is performed to make the curable parts in the area B are cured along a second direction. In this embodiment, the first direction and the second direction can be determined by applied electrical fields. That is, when the areas A and B are irradiated with the light, the applied electrical fields are different so as to cause the different first and second directions.

The following examples are only for illustrations and are not to limit the other parts of this disclosure in any situation. Persons skilled in the art can implement the embodiments according to the descriptions herein, irrespective of the absence of any further explanation.

EXAMPLE 1

Using Polymers with Curable Parts of the Formula (Y5) to Manufacture an MVA Type LCD Device The photo alignment material (ROP-903 polymer, Rolic, having the curable parts of the formula (Y5)) is coated on a TFT substrate, which has a pixel electrode with a plurality of slits, and a CF substrate to form the homeotropic alignment films. As shown in FIG. 8, the width of the slot 112a is 3.5 µm, and the width of the transparent electrode 112 is also 3.5 µm. The slot 112a and transparent electrode 112 are both tilted at 45°, and the width of the transparent electrode 112 in the center of the cross is 8.5 to 10 µm.

After baking the homeotropic alignment films to solidify them, the liquid crystal composition is disposed on one of the substrate, and then the two substrates are combined by via a sealing material. Then, a voltage is applied to the substrates, so that the orientations of the liquid crystal layer can be aligned by the oblique electrical field caused by the electrode slits 112a. Thus, the orientations of the liquid crystal layer have a plurality of tilting directions, which are tilted toward the center along the slot direction. Finally, during the voltage is applied to the two substrates, a UV light is provided to irradiate and cure the curable parts.

EXAMPLE 2

Using Polymers with Curable Parts of the Formula (Y5) and Mixing with Polyimide (PI) Having the Homeotropic Alignment Property to Manufacture an MVA Type LCD Device The homeotropic alignment composition (ROP-903 polymer, Rolic, having the curable parts of the formula (Y5)) and 2-4% polymer (RN1937 polymer, Nissan, having PI with the homeotropic alignment property) are coated on a TFT substrate, which has a pixel electrode with the herringbone-shaped slot, and a CF substrate to form the homeotropic alignment films. After baking the homeotropic alignment films to solidify them, the two substrates are combined by sealing material. Then, with the liquid crystal composition sealed between the substrates, a voltage is applied to the substrates, so that the orientations of the liquid crystal layer are aligned by the oblique electrical field caused by the electrode slits. Thus, the orientations of the liquid crystal layer have a plurality of tilting directions. Since the affinity exists between the curable parts and the liquid crystal molecules, each curable molecule will follow the tilting direction of the adjacent liquid crystal molecule. Finally, during the voltage is applied to the two substrates, a UV light is provided to irradiate and cure the curable parts.

When performing the reliability test (e.g. applying different voltages to several areas divided from the LCD panel to display the interlaced black and white image, and then applying the same voltages to these areas), the entire panel is theoretically displaying the same gray level. However, the panel manufactured according to the example displays different gray levels or shows the bright or dark strips, which causes a reliability analysis (RA) issue. This is because the alignment films of the example 1 are formed only by the polymer with the curable parts, so the anchoring force is insufficient or a residual DC voltage readily develops.

In the example 2, since the alignment film is form by the polymer with the curable parts and the PI with the homeotropic alignment property, the above-mentioned RA issue can be improved. In more details, the higher percentage the PI with the homeotropic alignment property (e.g. RN 1937), the better the result of the reliability test of the manufactured LCD panel (ROP903+4% RN1937>ROP903+3% RN1937>ROP903+2% RN1937>ROP903).

EXAMPLE 3

Figure 9:
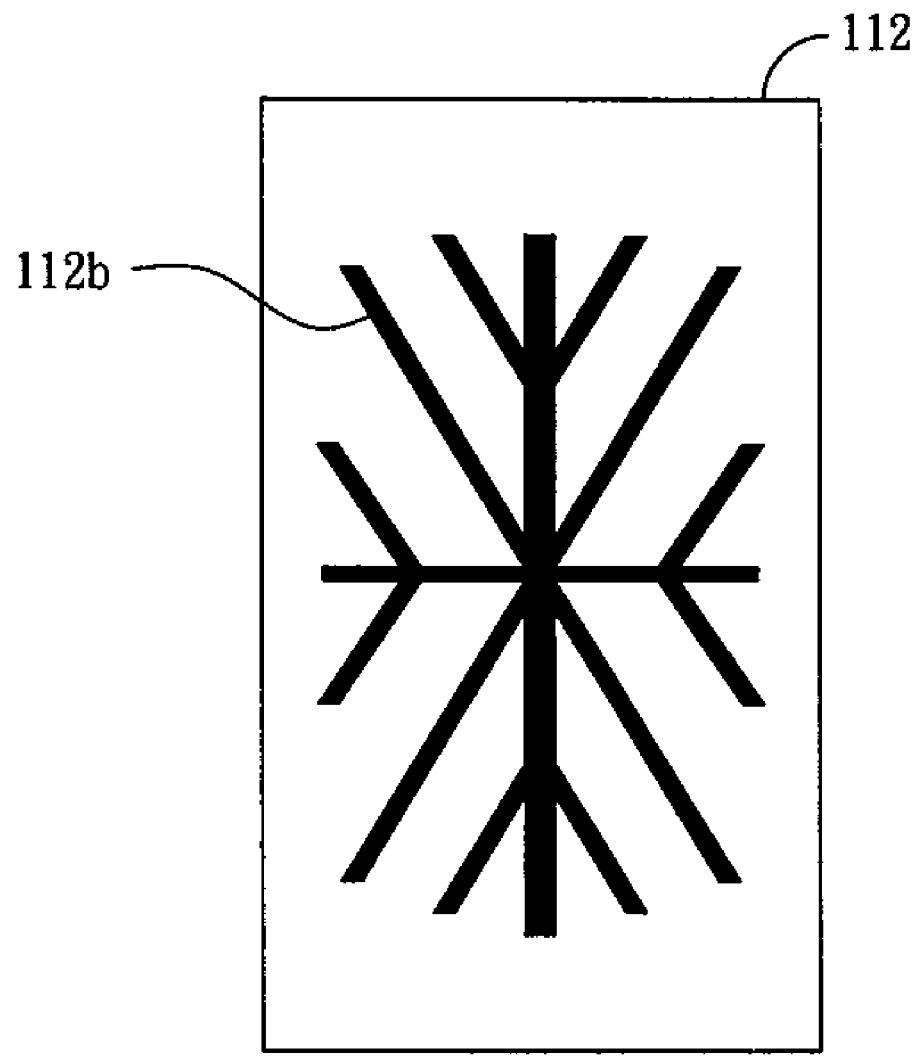
FIG. 9 is a top view showing a pixel electrode of a LCD device according to another embodiment.

Using Polymers with Curable Parts of the Formula (Y5) to Manufacture an MVA Type LCD Device The photo alignment material (ROP-903 polymer, Rolic, having the curable parts of the formula (Y5)) is coated on a TFT substrate, which has a pixel electrode with a herringbone-shaped slot as shown in FIG. 9, and a CF substrate to form the homeotropic alignment films.

After baking the homeotropic alignment films to solidify them, the two substrates are combined by a sealing material. Next, a voltage is applied to the substrates, so that the orientations of the curableparts of the alignment films are aligned by the oblique electrical field caused by the electrode slot. Thus, the orientations of the curable parts of the alignment films have a plurality of tilting directions. Then, while the voltage is applied to the two substrates, a UV light is used to irradiate and cure the curable parts. Finally, the substrates, which are combined and aligned, and a liquid crystal container, which contains the above-mentioned liquid crystal composition, are disposed in a vacuum chamber. At this time, the gap between the combined substrates is exposed to vacuum. After that, an input of the combined substrates is moved toward the liquid crystal container to contact the liquid crystal composition. Then, the vacuum is removed, so that the liquid crystal material can be sucked into the gap through the input according to the capillary effect and the pressure difference between the inside and outside of the combined substrates.

EXAMPLE 4

Using Polymers with Curable Parts of the Formula (Y5) to Manufacture an MVA Type LCD Device The photo alignment material (ROP-903 polymer, Rolic, having the curable parts of the formula (Y5)) is coated on a TFT substrate, which has a pixel electrode with a herringbone-shaped slot, to form the homeotropic alignment film.

After baking the homeotropic alignment film to solidify it, the voltage is applied to the gap between the substrate coated with the photo alignment material and another substrate, so that an electrical field can be formed on the substrate coated with the photo alignment material. Thus, the orientations of the curable parts of the alignment film can be aligned by the oblique electrical field induced by the electrode slot, so the orientations of the curable parts of the alignment film have a plurality of tilting directions. Then, while the voltage is applied, a UV light is used to irradiate and cure the curable parts. After that, the substrate and another substrate, which is also aligned, are combined with a sealing material. Finally, the combined substrates and a liquid crystal container, which contains the above-mentioned liquid crystal composition, are disposed in a vacuum chamber. At this moment, the gap between the combined substrates is exposed vacuum. After that, an input of the combined substrates is moved toward the liquid crystal container to contact the liquid crystal composition. Then, the vacuum is removed, so that the liquid crystal material is sucked into the gap through the input according to the capillary effect and the pressure difference between the inside and outside of the combined substrates.

Although the preceding disclosure has been given with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the scope of the following claims.

What is claimed is:

1. A method for alignment treatment of a substrate for a liquid crystal display (LCD) device, comprising:
    forming an alignment film comprising a plurality of molecules with curable parts on a first substrate;
    applying an electrical field to the first substrate to rotate the curable parts; and
    curing the curable parts such that the curable parts are cured along a first direction;
    wherein the curable parts are cross-linked by polymerization;

wherein the curable parts have formula (I) or (II):

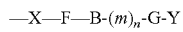  (I);

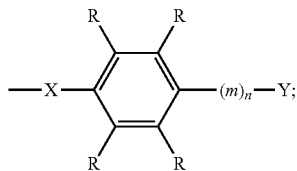  (II)

in which:

X represents a benzyl group, a cylco-hexyl group, —COO—, —O—, or —CH$_2$;

F represents

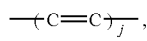

wherein j is 0 or a positive integer between 0 and 2;

B is selected form the group consisting of substituted or non-substituted 1,4-phenylenebis group, substituted or non-substituted diphenyl, and substituted or non-substituted 2,6-2-Naphthalenyl;

m represents —COO—, —O—, or —CH$_2$—;

n is a natural number;

G represents

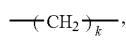

wherein k is 0 or a positive integer between 0 and 11;

R represents H or alkyl group; and

Y represents substituted or non-substituted acrylate group, substituted or non-substituted methyl-acrylate group, substituted or non-substituted vinyl, substituted or non-substituted vinyloxy group, or substituted or non-substituted epoxy group.

2. The method according to claim 1, wherein the first direction is substantially in the plane which is parallel to the first substrate.

3. A method for manufacturing a liquid crystal display (LCD) device, comprising:

forming a first alignment film comprising a plurality of molecules with curable parts on a first substrate;

combining the first substrate with a second substrate;

applying an electrical field to the first alignment film to rotate the curable parts;

curing the curable parts disposed on the first substrate such that the curable parts are cured along a first direction; and forming a liquid crystal layer between the first substrate and the second substrate;

wherein the curable parts are cross-linked by polymerization;

wherein the curable parts have formula (I) or (II):

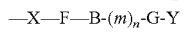  (I);

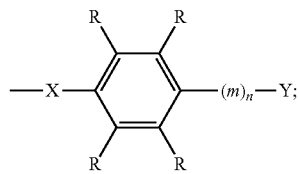  (II)

in which:

X represents a benzyl group, a cylco-hexyl group, —COO—, —O—, or —CH$_2$—;

F represents

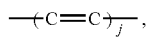

wherein j is 0 or a positive integer between 0 and 2;

B is selected form the group consisting of substituted or non-substituted 1,4-phenylenebis group, substituted or non-substituted diphenyl, and substituted or non-substituted 2,6-2-Naphthalenyl;

m represents —COO—, —O—, or —CH$_2$—;

n is a natural number;

G represents

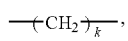

wherein k is 0 or a positive integer between 0 and 11;

R represents H or alkyl group; and

Y represents substituted or non-substituted acrylate group, substituted or non-substituted methyl-acrylate group, substituted or non-substituted vinyl, substituted or non-substituted vinyloxy group, or substituted or non-substituted epoxy group.

4. A method for manufacturing a liquid crystal display (LCD) device, comprising:

forming a first alignment film comprising a plurality of molecules with curable parts on a first substrate;

forming a liquid crystal layer comprising a plurality of liquid crystal molecules between the first substrate and a second substrate;

applying an electrical field to the liquid crystal layer and the first alignment film to rotate the liquid crystal molecules and the curable parts; and curing the curable parts such that the curable parts are cured along a first direction;

wherein the curable parts are cross-linked by polymerization;

wherein the curable parts have formula (I) or (II):

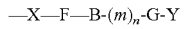  (I);

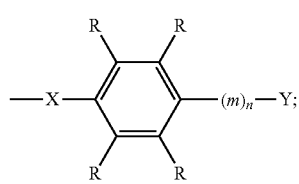  (II)

in which:

X represents a benzyl group, a cylco-hexyl group, —COO—, —O—, or —CH₂,

F represents $-\!\!\!+\!\!C\!\!=\!\!C\!\!\!\xrightarrow{}_{j}\!\!-,$ wherein j is 0 or a positive integer between 0 and 2;

B is selected form the group consisting of substituted or non-substituted 1,4-phenylenebis group, substituted or non-substituted diphenyl, and substituted or non-substituted 2,6-2-Naphthalenyl;

m represents —COO—, —O—, or —CH₂—;

n is a natural number;

G represents $-\!\!\!+\!\!CH_2\!\!\xrightarrow{}_{k}\!\!-,$ wherein k is 0 or a positive integer between 0 and 11;

R represents H or alkyl group; and

Y represents substituted or non-substituted acrylate group, substituted or non-substituted methyl-acrylate group, substituted or non-substituted vinyl, substituted or non-substituted vinyloxy group, or substituted or non-substituted epoxy group.

5. The method according to claim 4, wherein at least one of the first substrate and the second substrate has pixel electrodes with slits, and the width of slits are 3.5 μm and the pitch of slits are 3.5 μm, and the angle between data line and slits is about 45°.

6. The method according to claim 4, wherein the step of curing the curable parts is performed by a light curing process.

7. The method according to claim 4, wherein the step of curing the curable parts is performed by a thermal curing process.

8. The method according to claim 4, wherein the curable parts are cross-linked by cyclo-addition.

9. The method according to claim 4, wherein the first alignment film comprises a first polymer with a curable part and a second polymer with a curable part.

10. The method according to claim 4, wherein the first alignment film comprises a first polymer with a curable part and a second polymer with an another curable part.

11. The method according to claim 9, wherein the first polymer and the second polymer are co-polymerized to form the first alignment film.

12. The method according to claim 10, wherein the first polymer and the second polymer are co-polymerized to form the first alignment film.

13. The method according to claim 4, wherein the first alignment film further comprise a homeotropic alignment material, and the homeotropic alignment material is 1% to 4% of the composition.

14. The method according to claim 4, wherein Y comprises one of the following formulas (Y1), (Y2), (Y3-1), (Y3-2), (Y4), (Y5), (Y6), (Y7), (Y8), (Y9-1), (Y9-2), (Y10-1), (Y10-2), (Y11):

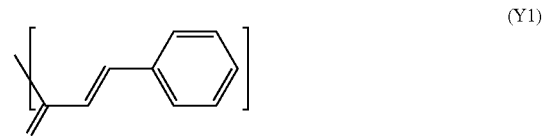 (Y1)

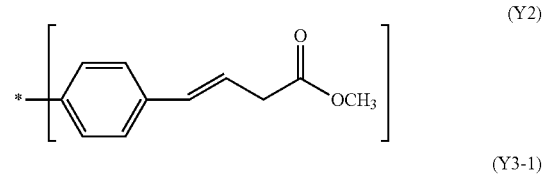 (Y2)

 (Y3-1)

 (Y3-2)

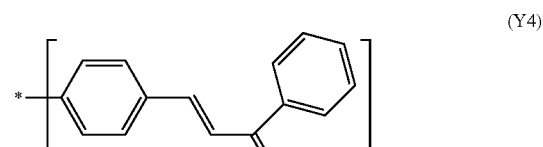 (Y4)

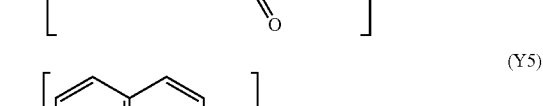 (Y5)

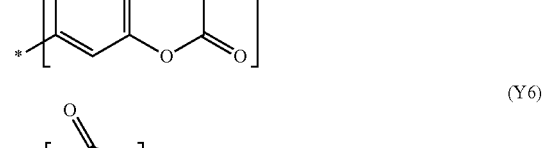 (Y6)

 (Y7)

 (Y8)

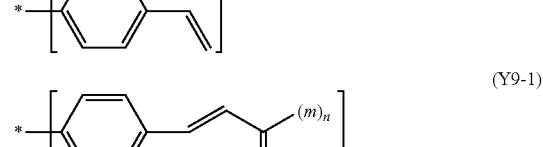 (Y9-1)

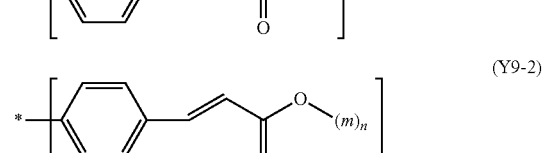 (Y9-2)

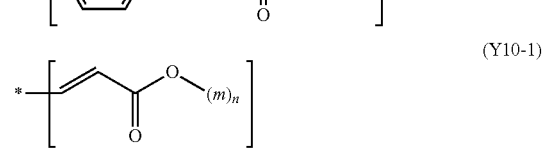 (Y10-1)

-continued

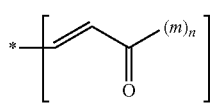
(Y10-2)

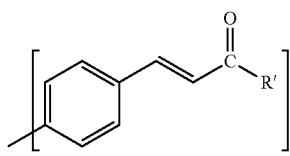
(Y11)

wherein, in the formula (Y9-1), (Y9-2), (Y10-1) or (Y10-2), m represents —COO—, —O— or —CH$_2$—, and in the formula (Y9-1), (Y9-2), (Y10-1) or (Y10-2), n is a natural number; in the formula (Y11), R' represents —O—C$_q$H$_{2q+1}$, q is 0 or integer between 1 and 20, or R' represents one of the groups of the following formulas (Z1), (Z2), (Z3) and (Z4):

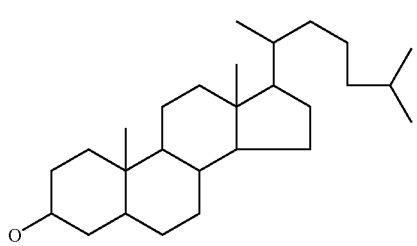
(Z1)

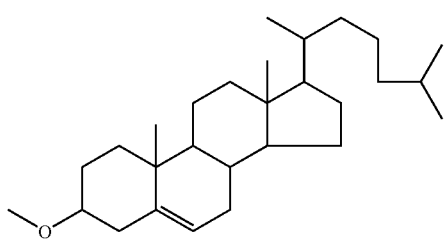
(Z2)

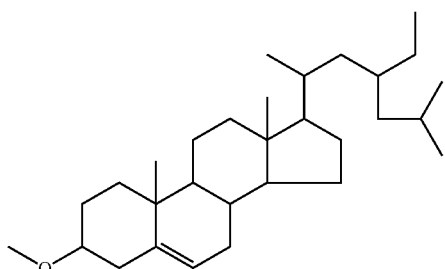
(Z3)

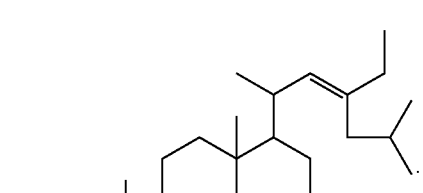
(Z4)

15. The method according to claim 5, wherein the curable parts comprise a partial structure comprising the following formula (III):

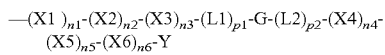
(III)

wherein, a monovalent link is bonded to a main chain of a polymer;

X1, X2, X3, X4, X5 and X6 are the same or different, and each of X1, X2, X3, X4, X5 and X6 represents:

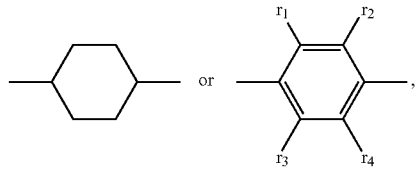

wherein $r_1$, $r_2$, $r_3$ and $r_4$ are the same or different, and each of $r_1$, $r_2$, $r_3$ and $r_4$ represents H, F or Cl;

n1, n2, n3, n4, n5 and n6 are the same or different, each of n1, n2, n3, n4, n5 and n6 is 0 or a natural number, and n1+n2+n3≦3 and n4+n5+n6≦3;

L1 and L2 are the same or different, and each of L1 and L2 represents —O—, —COO— or —C═C—;

p1 and p2 are the same or different, and each of p1 and p2 is 0 or 1;

G represents

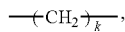

wherein k is 0 or a positive integer between 0 and 18; and

Y represents one of the groups of the following formulas (Y2-1), (Y3-3), (Y4-1), (Y5-1), (Y6), (Y7), (Y8), (Y9), (Y10), (Y11), (Y12), (Y13) and (Y14):

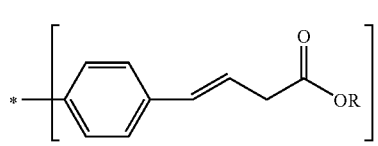
(Y2-1)

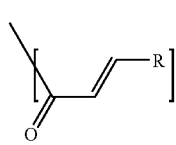
(Y3-3)

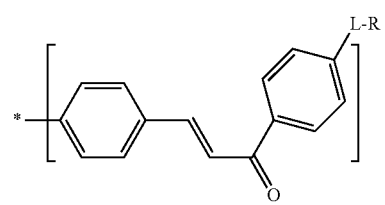
(Y4-1)

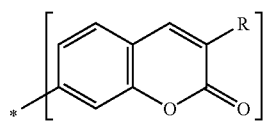
(Y5-1)

-continued

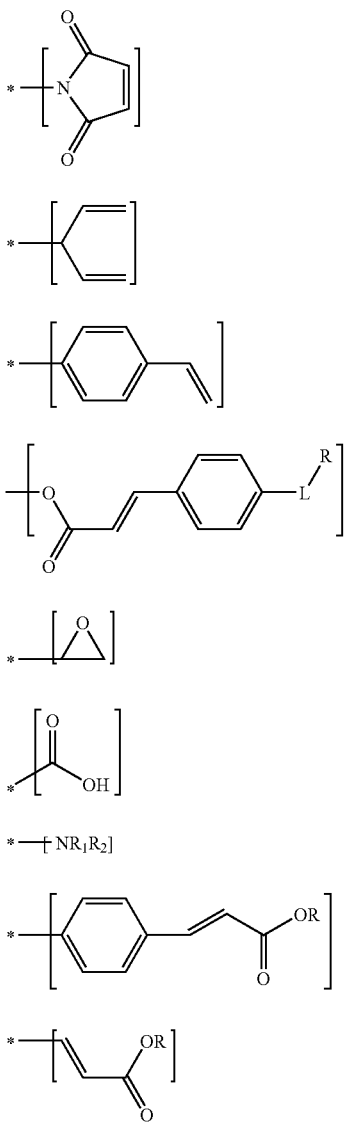

(Y6)
(Y7)
(Y8)
(Y9)
(Y10)
(Y11)
(Y12)
(Y13)
(Y14)

wherein, L represents —O—, —COO— or —C=C—, R represents H or alkyl group, $R_1$ and $R_2$ are the same of different, and each of $R_1$ and $R_2$ represents H or alkyl group.

16. The method according to claim 4, wherein the curable parts comprises both of a UV-light curable part and a thermal curable part.

17. The method according to claim 4, wherein the curable parts further comprises a homeotropic alignment part comprising one of the following formula (IV) or (V):

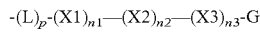 (IV)

-(L)$_p$-Q (V)

wherein, a monovalent link is bonded to a main chain of a polymer;

L represents —O—, —COO— or —C=C—;

p is 0 or 1;

X1, X2 and X3 are the same or different, and each of X1, X2 and X3 represents:

wherein $r_1$, $r_2$, $r_3$ and $r_4$ are the same or different, and each of $r_1$, $r_2$, $r_3$ and $r_4$ represents H, F or Cl;

n1, n2 and n3 are the same or different, each of n1, n2 and n3 is 0 or a natural number, and n1+n2+n3≦3;

G represents $-(CH_2)_k-$, wherein k is 0 or a positive integer between 0 and 18; and Q represents one of the groups of the following formulas (Q1), (Q2), (Q3) and (Q4):

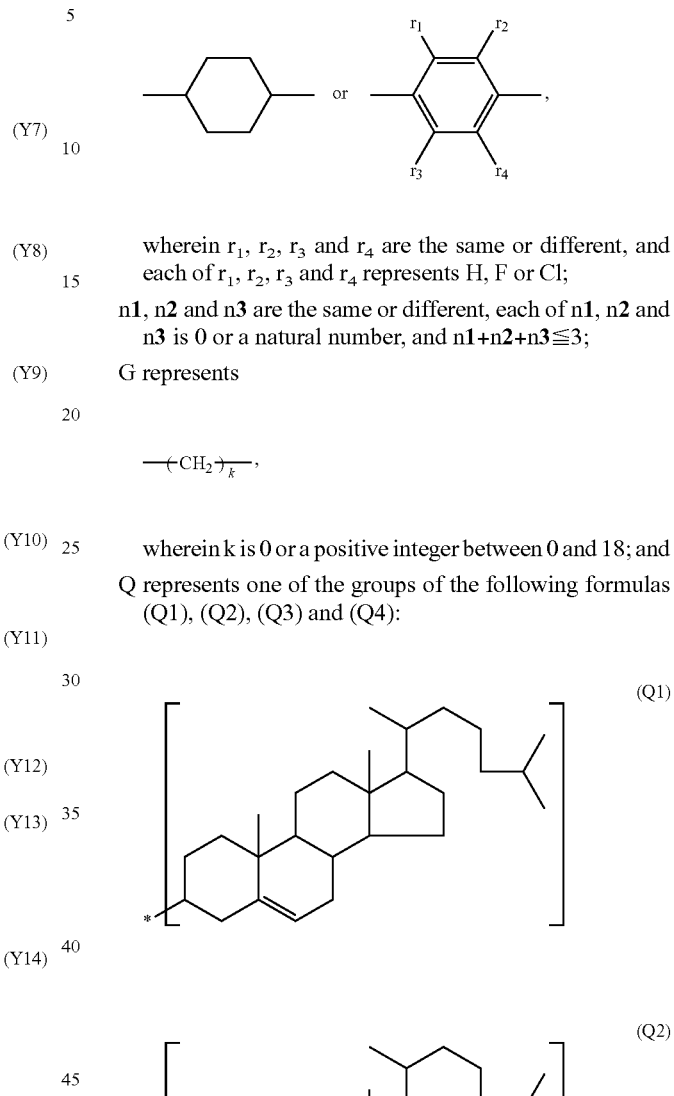

(Q1)

(Q2)

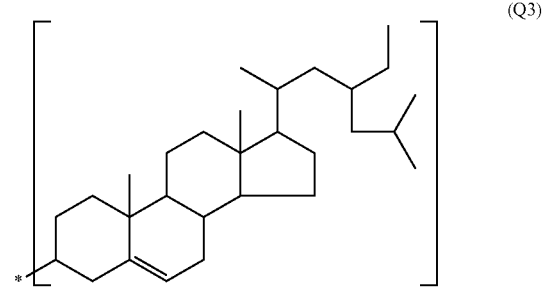

(Q3)

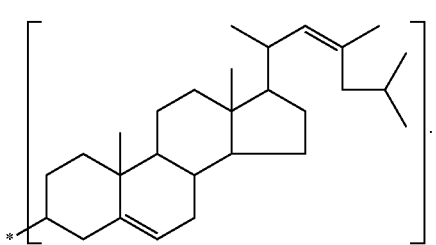
(Q4)

18. A composition for forming an alignment film, comprising:
a photo alignment material comprising curable parts; and
a homeotropic alignment material, wherein the homeotropic alignment material is 1% to 4% of the composition;
wherein the curable can be cross-linked by polymerization;
wherein the curable parts have formula (I) or (II):

$$-X-F-B-(m)_n-G-Y \quad (I);$$

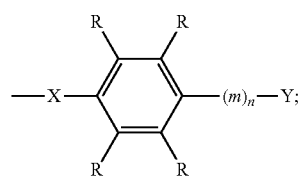
(II)

in which:
X represents a benzyl group, a cylco-hexyl group, —COO—, —O—, or —CH$_2$—;
F represents $$-(C=C)_j-,$$

wherein j is 0 or a positive integer between 0 and 2;
B is selected form the group consisting of substituted or non-substituted 1,4-phenylenebis group, substituted or non-substituted diphenyl, and substituted or non-substituted 2,6-2-Naphthalenyl;
m represents —COO—, —O—, or —CH$_2$—;
n is a natural number;
G represents $$-(CH_2)_k-,$$

wherein k is 0 or a positive integer between 0 and 11;
R represents H or alkyl group; and
Y represents substituted or non-substituted acrylate group, substituted or non-substituted methyl-acrylate group, substituted or non-substituted vinyl, substituted or non-substituted vinyloxy group, or substituted or non-substituted epoxy group.

19. The composition according to claim 18, wherein the Y comprising one of the following formulas (Y1), (Y2), (Y3-1), (Y3-2), (Y4), (Y5), (Y6), (Y7), (Y8), (Y9-1), (Y9-2), (Y10-1), (Y10-2), (Y11):

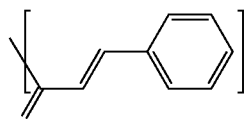
(Y1)

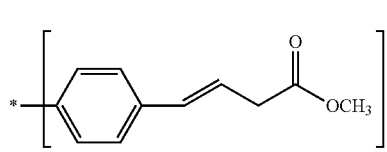
(Y2)

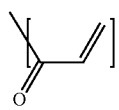
(Y3-1)

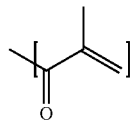
(Y3-2)

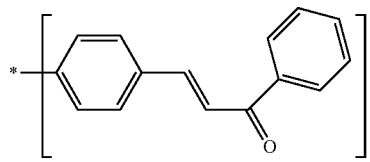
(Y4)

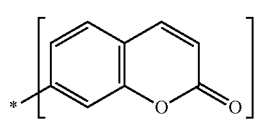
(Y5)

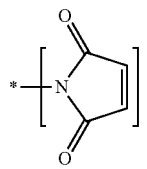
(Y6)

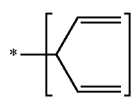
(Y7)

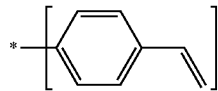
(Y8)

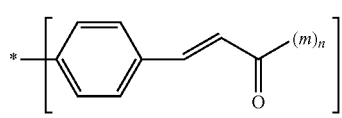
(Y9-1)

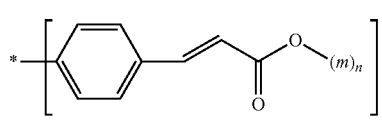
(Y9-2)

(Y10-1)

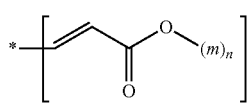

(Y10-2)

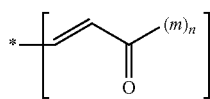

(Y11)

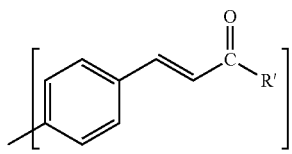

wherein, in the formula (Y9-1), (Y9-2), (Y10-1) or (Y10-2), m represents —COO—, —O— or —CH$_2$—, and in the formula (Y9-1), (Y9-2), (Y10-1) or (Y10-2), n represents a natural number; in the formula (Y11), R' represents —O—C$_q$H$_{2q+1}$, q is 0 or integer between 1 and 20, or R' represents one of the groups of the following formulas (Z1), (Z2), (Z3) and (Z4):

(Z1)

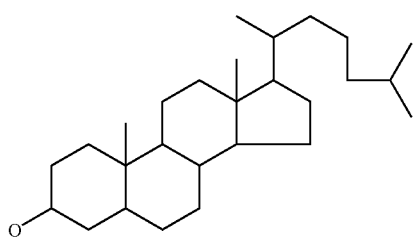

(Z2)

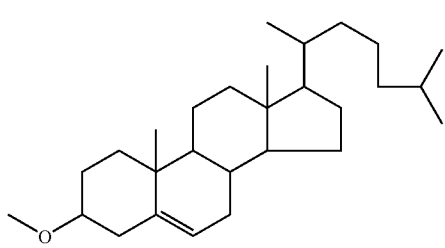

(Z3)

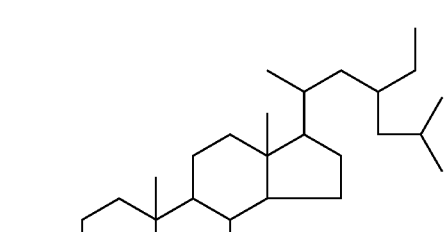

(Z4)

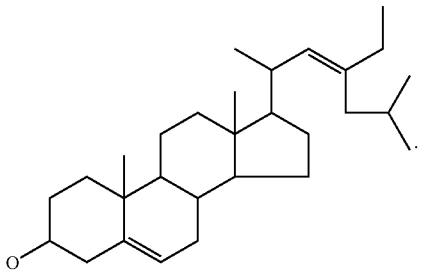

20. The composition according to claim 18, wherein the homeotropic alignment material comprises a plurality of molecules with a homeotropic alignment property, and the molecule has a partial structure comprising one of the following formulas (V1), (V2), (V3) and (V4):

V1

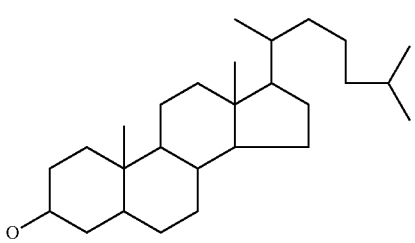

V2

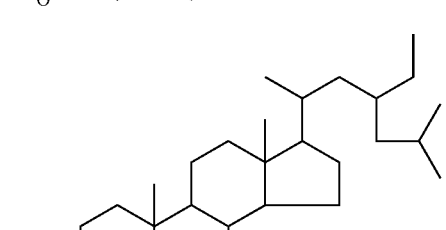

V3

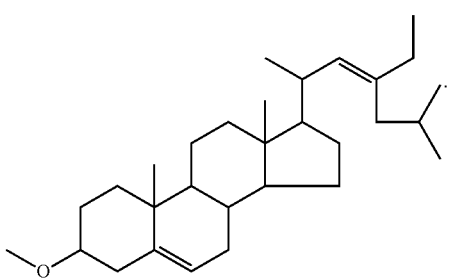

V4

* * * * *